United States Patent
Sueoka

(10) Patent No.: US 8,948,588 B2
(45) Date of Patent: Feb. 3, 2015

(54) NODE EQUIPMENT

(75) Inventor: Hideki Sueoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 263 days.

(21) Appl. No.: 13/521,354

(22) PCT Filed: Apr. 20, 2011

(86) PCT No.: PCT/JP2011/002318
§ 371 (c)(1),
(2), (4) Date: Jul. 10, 2012

(87) PCT Pub. No.: WO2011/132417
PCT Pub. Date: Oct. 27, 2011

(65) Prior Publication Data
US 2012/0321300 A1      Dec. 20, 2012

(30) Foreign Application Priority Data

Apr. 22, 2010  (JP) .................................. 2010-098899

(51) Int. Cl.
*H04J 14/02* (2006.01)
*H04B 10/079* (2013.01)
*H04B 10/294* (2013.01)

(52) U.S. Cl.
CPC ...... *H04J 14/0221* (2013.01); *H04B 10/07955* (2013.01); *H04B 10/2941* (2013.01)
USPC ................................ 398/15; 398/20; 398/158

(58) Field of Classification Search
CPC ............. H04B 10/2933; H04B 10/294; H04B 10/0795; H04B 10/07955
USPC ....................... 398/25, 34, 37, 94, 15, 20, 158
See application file for complete search history.

(56) References Cited

U.S. PATENT DOCUMENTS

| 7,463,829 B2 | 12/2008 | Uda et al. |
| 8,050,574 B2 | 11/2011 | Onaka |

(Continued)

FOREIGN PATENT DOCUMENTS

| CN | 1841968 A | 10/2006 |
| CN | 101113939 A | 1/2008 |

(Continued)

OTHER PUBLICATIONS

International Search Report issued on Jul. 26, 2011 in PCT/JP11/002318 filed on Apr. 20, 2011.

(Continued)

*Primary Examiner* — Leslie Pascal
(74) *Attorney, Agent, or Firm* — Oblon, Spivak, McClelland, Maier & Neustadt, L.L.P.

(57) ABSTRACT

Node equipment 1, having optical attenuator unit 21 for optically attenuating wavelength division multiplexing signals received and optical multiplexer/demultiplexer unit 5 for performing optical multiplexing/demultiplexing of the wavelength division multiplexing signals received from the optical attenuator unit 21 via an optical cord 11, includes: output level detecting unit 24 for detecting the optical power level of the wavelength division multiplexing signals at a pre-stage of the optical cord 11; input level detecting unit 52 for detecting the optical power level of the wavelength division multiplexing signals at a post-stage of the optical cord 11; deciding unit 25 for deciding abnormality of the optical power level loss through the optical cord 11 from the optical power levels detected by the output level detecting unit 24 and input level detecting unit 52; and control unit 26 for controlling the optical attenuation of the optical attenuator unit 21 according to the abnormality decision result by the deciding unit 25.

10 Claims, 15 Drawing Sheets

(56) References Cited

U.S. PATENT DOCUMENTS

| | | | |
|---|---|---|---|
| 2005/0158057 A1 | 7/2005 | Tomofuji et al. | |
| 2006/0018658 A1 | 1/2006 | Mori | |
| 2006/0222367 A1* | 10/2006 | Onaka et al. | 398/83 |
| 2007/0116470 A1 | 5/2007 | Mino | |
| 2008/0159753 A1 | 7/2008 | Tomofuji et al. | |

FOREIGN PATENT DOCUMENTS

| | | |
|---|---|---|
| JP | 2005 204026 | 7/2005 |
| JP | 2005 277842 | 10/2005 |
| JP | 2006 33542 | 2/2006 |
| JP | 2006 279610 | 10/2006 |
| JP | 2007 150471 | 6/2007 |
| JP | 2008 236026 | 10/2008 |

OTHER PUBLICATIONS

Office Action issued Oct. 8, 2014 in Chinese Patent Application No. 201180020274.1 (with English translation and corresponding to US 2008/0144015 A1).

* cited by examiner

NODE EQUIPMENT

TECHNICAL FIELD

The present invention relates to node equipment with functions of transmitting and multiplexing/demultiplexing wavelength division multiplexing signals, and particularly to node equipment that does not affect a service wavelength even if an unsuitable connection occurs in an optical connector in the node equipment.

BACKGROUND ART

A wavelength division multiplexing optical transmission system having a plurality of pieces of node equipment connected is an optical transmission communication system that increases the transmission capacity of signals transmitted through a single fiber by wavelength multiplexing signal light waves assigned to a plurality of wavelengths by using wavelength division multiplexing.

The wavelength division multiplexing is a communication method that applies the fact that signal light waves with different wavelengths can exist independently, and can increase the transmission capacity easily by increasing the number of wavelengths to be subjected to the wavelength multiplexing. In addition, it can carry out multiplexing/demultiplexing of a particular wavelength without affecting the other wavelengths.

Furthermore, thanks to research and development of optical transmission technology and optical devices, long-distance transmission and an increasing number of wavelength multiplexing are realized by utilizing optical amplification technique as typified by EDFAs (Erbium-Doped Fiber Amplifiers) capable of achieving broadband and high gain optical amplification of wavelength division multiplexing signals as they are without any electrical conversion and by utilizing high multiplexing number and low loss wavelength multiplexing/demultiplexing devices as typified by arrayed-waveguide gratings (AWGs).

Such a wavelength division multiplexing optical transmission system comprises an optical amplification functional unit for compensating for a loss of optical power levels caused through a transmission path and various optical devices; a wavelength multiplexing/demultiplexing functional unit for carrying out multiplexing/demultiplexing of wavelengths; a transponder functional unit that has a function of converting a signal received from a downstream device to a signal light wave with a wavelength assigned to the wavelength division multiplexing optical transmission system and transmits to a wavelength multiplexing/demultiplexing functional unit, and a function of receiving a demultiplexed signal light wave from the wavelength multiplexing/demultiplexing functional unit and converting it to a signal for a downstream device and transmitting to the downstream device; and a monitoring control unit for monitoring the functional units.

In addition, as a network becomes complicated, demands on the wavelength division multiplexing optical transmission system are growing. Thus, it copes with the demands by incorporating a dispersion compensation functional unit for suppressing signal degradation due to dispersion in a fiber, a switch functional unit for carrying out in the wavelength multiplexing/demultiplexing functional unit the multiplexing (Add)/demultiplexing (Drop)/transmission (Through) of a wavelength to deal with a network path change request from a remote region, and a DGE (Dynamic Gain Equalizer) functional unit for equalizing optical power levels of the individual wavelengths.

The wavelength division multiplexing optical transmission system with such a configuration is constructed on the assumption that the signal light waves assigned to the individual wavelengths are independent and that a fault of a signal light wave of a different wavelength does not affect the signal quality of signal light waves having nothing to do with the fault.

However, as for a fault of the optical amplification functional unit for amplifying the wavelength division multiplexing signals as a whole or that of the wavelength multiplexing/demultiplexing functional unit, or a physical phenomenon such as nonlinear optical effects occurring in a transmission path connecting between two or more pieces of node equipment, they can sometimes affect all the wavelengths and degradation can sometimes occur in signal light waves having nothing to do with the fault. Accordingly, it is necessary to manage signal degradation factors rightly in a system design and construction, and a mechanism is required for preventing a fault, even if it occurs, from affecting the signal quality of signal light waves with wavelengths having nothing to do with the fault.

Accordingly, to ensure long-distance transmission and high transmission quality, the wavelength division multiplexing optical transmission system manages optical devices such as an optical amplifier and variable optical attenuator in the optical amplification functional unit rightly by carrying out feedforward or feedback control in such a manner as to adjust the optical power level appropriately for each wavelength. In particular, to increase quality of maintenance and operation, the system is usually divided into several pieces of node equipment or packages in accordance with individual functional blocks, and sometimes undergoes feedback control to control optical power levels over the packages.

Accordingly, as for connection optical cords that connect between the packages, even if the loss of their optical power levels increases because of fiber microbending (a sharp reduction of the radius of curvature of a fiber), sticking of a foreign body to an end face of an optical connector or a half fit of the optical connector, the system can automatically adjust the gain of the optical amplifier or the loss of a variable optical attenuator through the feedback control to achieve a target optical power level which is a management value.

On the other hand, there are some cases where a package is exchanged during system maintenance, and a half fitting state or a half extracted state of an optical connector (a state in which the optical connector is pulled out halfway) can occur in a connection optical cord that connects between the packages in an upstream device or package of the DGE functional unit, in which case a maintenance worker often notices the half extracted state after that and fits the optical connector completely again to correct it.

In addition, as a wavelength division multiplexing optical transmission system, there are a Point-to-Point system and a ring system based on an OADM (Optical Add Drop Multiplexer) that Add/Drop/Through only any given wavelength in light as it is. Since the ring system based on the OADM causes its component, an OADM device (referred to as "node equipment" from now on), to carry out Through setting and Add/Drop setting for each wavelength, the individual settings are mixed together in operation. In a ring configuration, when a fault occurs in a transmission path or upstream node equipment, even though a signal light wave with a wavelength passing through the faulty place has a fault, a signal light wave with a wavelength that does not pass through that place should be free from a fault.

However, when an optical connector in a half extracted state between packages in the upstream are inserted again, only a signal light wave with a Through set wavelength (Through wavelength) has an instantaneous level increase in the output of the DGE functional unit. On the other hand, since a signal light wave with an Add set wavelength (Add wavelength) is not affected by the reinsertion of the optical connector, it maintains its normal optical power level. Accordingly, a transmission light amplifier placed downstream of the DGE functional unit has an optical power level difference between the input signal light wave with the Add wavelength and the input signal light wave with the Through wavelength, and the Through wavelength becomes an excessive input state.

On the other hand, although the transmission light amplifier can amplify a signal light wave as it is by using an excitation laser diode, its output level has a saturation level (Psat_th) as its total power and it cannot output power beyond that.

Accordingly, when the total power becomes an excessive input state for the transmission light amplifier, gain saturation occurs in the transmission light amplifier. Thus it cannot maintain the gain of the individual wavelengths at a constant value, and has a phenomenon of reducing the gain of the shortwave side optical output power level (optical power level of the signal light wave with the Add wavelength) markedly.

When such an instantaneous optical power level reduction occurs, a signal receiver unit on the opposite side cannot maintain the signal quality and can cause an information loss. Thus, it has a problem of affecting the signal quality of signal light waves with wavelengths other than those at the faulty spot when the optical connector is reinserted.

Considering this, a wavelength division multiplexing optical transmission system disclosed in Patent Document 1 is configured in such a manner that it comprises an optical power level adjusting unit in each receiver unit after demultiplexing the wavelength division multiplexing signals, and causes the optical power level adjusting unit to control the level when fluctuations occur in the wavelength number.

PRIOR ART DOCUMENT

Patent Document

Patent Document 1: Japanese Patent Laid-Open No. 2008-236026.

DISCLOSURE OF THE INVENTION

Problems to be Solved by the Invention

As described above, as for the conventional wavelength division multiplexing optical transmission systems, many of them take measures against a fault that can occur in the transmission path and have a mechanism for absorbing level fluctuations at the input of the node equipment. As for the connection optical cords connecting between the packages in the node equipment, however, it is assumed that losses of their optical power levels do not vary. Accordingly, there is a problem of not considering a transient state due to a mistake during working of a maintenance person.

In addition, as for the conventional wavelength division multiplexing optical transmission system disclosed in the Patent Document 1, if a fault occurs in the node equipment, it has a problem of being unable to suppress the sharp and large level fluctuations involved in the gain saturation of the optical amplifier, thereby affecting the signal quality. Furthermore, to implement the wavelength division multiplexing optical transmission system disclosed in the Patent Document 1, it is necessary for the optical power level adjusting unit to carry out attenuation and amplification of light at a ultrahigh control speed, which presents a problem of being impractical.

The present invention is implemented to solve the foregoing problems. Therefore it is an object of the present invention to provide node equipment capable of constructing a low-cost highly-reliable system which does not affect the signal quality of service wavelengths having nothing to do with a fault even if abnormality occurs in a connection optical cord in the node equipment during maintenance of the system.

Means for Solving Problems

Node equipment in accordance with the present invention, which has an optical attenuator unit for optically attenuating received wavelength division multiplexing signals and an optical multiplexer/demultiplexer unit for carrying out optical multiplexing/demultiplexing of the wavelength division multiplexing signals received from the optical attenuator unit via an optical cord, includes: an output level detecting unit for detecting an optical power level of the wavelength division multiplexing signals at a pre-stage of the optical cord; an input level detecting unit for detecting an optical power level of the wavelength division multiplexing signals at a post-stage of the optical cord; a deciding unit for making an abnormality decision of a loss of an optical power level through the optical cord from the optical power level detected by the output level detecting unit and from the optical power level detected by the input level detecting unit; and a control unit for controlling the optical attenuation of the optical attenuator unit in accordance with the abnormality decision result by the deciding unit.

Advantages of the Invention

According to the present invention, it has the configuration as described above and includes the output level detecting unit for detecting the optical power level of the wavelength division multiplexing signals at the pre-stage of the optical cord, the input level detecting unit for detecting the optical power level of the wavelength division multiplexing signals at the post-stage of the optical cord, the deciding unit for making the abnormality decision of the loss of the optical power level through the optical cord from the optical power level detected by the output level detecting unit and from the optical power level detected by the input level detecting unit, and the control unit for controlling the optical attenuation of the optical attenuator unit in accordance with the abnormality decision result by the deciding unit. As a result, since it can prevent a transmitting-side optical amplifier unit from receiving a sharp level increase, it can ensure the signal quality of an Add wavelength. In addition, it can also reduce the gain saturation level of the transmitting-side optical amplifier unit, thereby being able to reduce the output power of the excitation LD used in the transmitting-side optical amplifier unit, and hence to reduce the cost.

EMBODIMENTS FOR CARRYING OUT THE INVENTION

The best mode for carrying out the invention will now be described with reference to the accompanying drawings.

Embodiment 1

Figure 1:
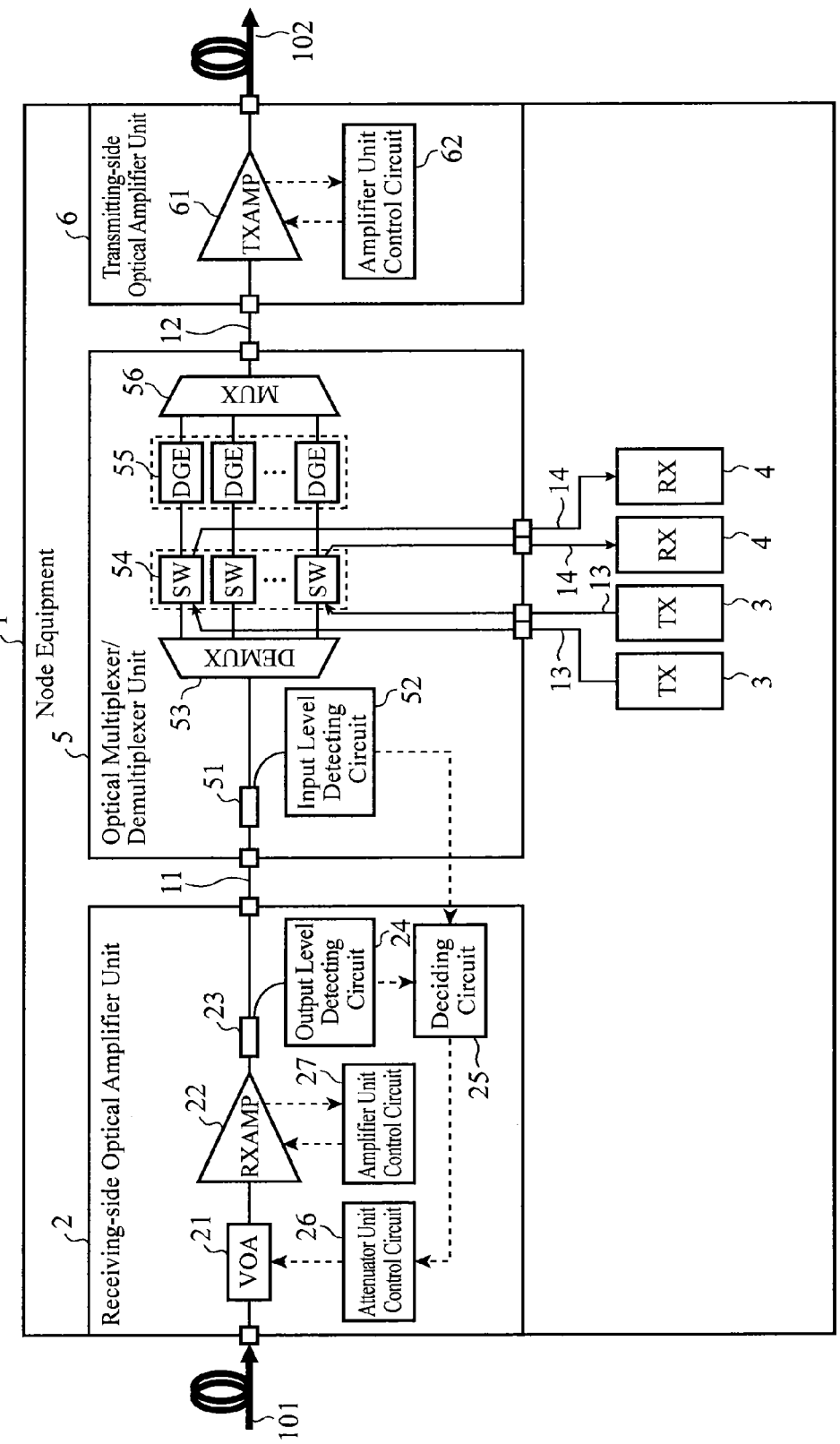
FIG. 1 is a block diagram showing a configuration of the node equipment of an embodiment 1 in accordance with the present invention.

FIG. 1 is a block diagram showing a configuration of the node equipment 1 of the embodiment 1 in accordance with the present invention. Incidentally, a wavelength division multiplexing optical transmission system has a plurality of pieces of node equipment 1 connected via a transmission path.

As shown in FIG. 1, the node equipment 1 comprises a receiving-side optical amplifier unit 2, a plurality of signal transmitter units (TX) 3, a plurality of signal receiver units (RX) 4, an optical multiplexer/demultiplexer unit 5 and a transmitting-side optical amplifier unit 6.

The receiving-side optical amplifier unit 2 is a unit for compensating for the loss of a transmission path with respect to the optical power level of wavelength division multiplexing signals received from upstream node equipment (not shown) via a transmission path 101. The receiving-side optical amplifier unit 2 comprises a variable optical attenuator unit (VOA) 21, a receiving-side optical amplification functional unit (RXAMP: optical amplifier unit) 22, an optical branching coupler 23, an output level detecting circuit (output level detecting unit) 24, a deciding circuit (deciding unit) 25, an attenuator unit control circuit (control unit) 26 and an amplifier unit control circuit (control unit) 27.

The variable optical attenuator unit 21 is a unit for optically attenuating the wavelength division multiplexing signals received from the upstream node equipment via the transmission path 101 in accordance with the control of the attenuator unit control circuit 26. The wavelength division multiplexing signals optically attenuated by the variable optical attenuator unit 21 are sent to the receiving-side optical amplification functional unit 22.

The receiving-side optical amplification functional unit 22 is a unit for optically amplifying the wavelength division multiplexing signals optically attenuated through the variable optical attenuator unit 21 in accordance with the control by the amplifier unit control circuit 27. The wavelength division multiplexing signals optically amplified through the receiving-side optical amplification functional unit 22 are sent to the optical branching coupler 23.

The optical branching coupler 23 is for optically branching the wavelength division multiplexing signals optically amplified through the receiving-side optical amplification functional unit 22. A first part of the wavelength division multiplexing signals optically branched through the optical branching coupler 23 is delivered as it is to the optical multiplexer/demultiplexer unit 5 via the connection optical cord (optical cord) 11, and a second part of the wavelength division multiplexing signals is delivered to the output level detecting circuit 24.

The output level detecting circuit 24 is a unit for periodically detecting and observing the total optical power level (absolute value) of the wavelength division multiplexing signals optically branched through the optical branching coupler 23. The detection result of the optical power level (Prx_out) by the output level detecting circuit 24 is sent to the deciding circuit 25.

The deciding circuit 25 is a unit for calculating the loss (L=Prx_out−Padm_in) of the optical power level through the connection optical cord 11 by comparing the detection result of the optical power level (Prx_out) by the output level detecting circuit 24 with the detection result of the optical power level (Padm_in) by an input level detecting circuit 52 in the optical multiplexer/demultiplexer unit 5, which will be described later, and for deciding on whether the loss (L) is in an abnormal state or not. If it decides that the loss (L) is in the abnormal state, the deciding circuit 25 notifies the attenuator unit control circuit 26 of that (abnormality decision notification) to increase the optical attenuation of the variable optical attenuator unit 21.

In addition, after deciding that the loss (L) is in the abnormal state, the deciding circuit 25 calculates the loss (L) of the optical power level through the connection optical cord 11 by comparing the detection result of the optical power level (Prx_out) by the output level detecting circuit 24 with the detection result of the optical power level (Padm_in) by the input level detecting circuit 52, and decides on whether the loss (L) is returned to a normal state or not. When deciding that the loss (L) is returned to the normal state, the deciding circuit 25 notifies the attenuator unit control circuit 26 of that (normality decision notification) to return the optical attenuation of the variable optical attenuator unit 21 to a normal value.

The attenuator unit control circuit 26 is a unit for controlling the optical attenuation of the variable optical attenuator unit 21 in such a manner as to maintain the optical power level of the wavelength division multiplexing signals supplied to the receiving-side optical amplification functional unit 22 at a fixed value in accordance with the transmission path loss of the wavelength division multiplexing signals received by the variable optical attenuator unit 21. In addition, when receiving the abnormality decision notification from the deciding circuit 25, the attenuator unit control circuit 26 sets itself at a fixed attenuation mode and increases the optical attenuation of the variable optical attenuator unit 21. In contrast, when receiving the normality decision notification from the deciding circuit 25, the attenuator unit control circuit 26 sets itself at a normal mode and returns the optical attenuation of the variable optical attenuator unit 21 to a normal value.

The amplifier unit control circuit 27 is a unit for controlling the optical amplification of the receiving-side optical amplification functional unit 22. To make the optical power level per wavelength constant, the amplifier unit control circuit 27 carries out AGC in such a manner as to make the ratio (gain) constant between the total input level and the total output level of the receiving-side optical amplification functional unit 22. In addition, APC (Automatic Power Control) is also possible which maintains the output power level at a fixed value regardless of the input level, or switching between the control methods is also possible.

Each signal transmitter unit 3 is a unit for transmitting a signal light wave assigned to each wavelength as it is to the optical multiplexer/demultiplexer unit 5 via the connection optical cord 13.

Each signal receiver unit 4 is a unit for receiving the corresponding signal light wave as it is which passes through the demultiplexing by the optical multiplexer/demultiplexer unit 5 via the connection optical cord 14.

The optical multiplexer/demultiplexer unit 5 is a unit for performing, on the wavelength division multiplexing signals received from the receiving-side optical amplifier unit 2, multiplexing (Add) the signal light wave received from the signal transmitter unit 3, demultiplexing (Drop) the signal light wave with a particular wavelength and transmitting it to the signal receiver unit 4, or transmitting the signal light wave as it is (Through). The optical multiplexer/demultiplexer unit 5 comprises an optical branching coupler 51, an input level detecting circuit (input level detecting unit) 52, a demultiplexing functional unit (DEMUX) 53, a plurality of individual channel optical switch functional units (SW) 54, a plurality of individual channel optical level equalizer units (DGE) 55 and a multiplexing functional unit (MUX) 56.

The optical branching coupler 51 is for optically branching the wavelength division multiplexing signals received from the receiving-side optical amplifier unit 2 via the connection optical cord 11. A first part of the wavelength division multiplexing signals optically branched by the optical branching coupler 51 is transmitted to the demultiplexing functional unit 53 and a second part of the wavelength division multiplexing signals is sent to the input level detecting circuit 52.

The input level detecting circuit 52 is a unit for periodically detecting and observing the total optical power level (absolute value) of the wavelength division multiplexing signals optically branched through the optical branching coupler 51. The detection result of the optical power level (Padm_in) by the input level detecting circuit 52 is sent to the deciding circuit 25 by electrical communication via a backboard or by inter-package communication such as front electrical connection.

Incidentally, as for the inter-package communication, it is assumed that it has a parity check or CRC error check function for ensuring the validity of the communication.

The demultiplexing functional unit 53 is a unit for demultiplexing the wavelength division multiplexing signals optically branched through the optical branching coupler 51 into individual wavelengths. The signal light waves demultiplexed into the individual wavelengths through the demultiplexing functional unit 53 is delivered to the individual channel optical switch functional units 54 corresponding to the individual wavelengths.

The individual channel optical switch functional unit 54 is a unit for selecting one of Through/Drop/Add of the signal light wave. When the individual channel optical switch functional unit 54 is set at Through, it transmits the signal light wave demultiplexed through the demultiplexing functional unit 53 as it is to the individual channel optical level equalizer unit 55. Besides, when the individual channel optical switch functional unit 54 is set at Drop, it transmits the signal light wave demultiplexed through the demultiplexing functional unit 53 as it is to the signal receiver unit 4 via the connection optical cord 14. In addition, when the individual channel optical switch functional unit 54 is set at Add, it transmits the signal light wave received from the signal transmitter unit 3 via the connection optical cord 13 to the individual channel optical level equalizer unit 55.

The individual channel optical level equalizer unit 55 is a unit for automatically adjusting, as to the signal light wave received from the individual channel optical switch functional unit 54, its optical power level to a target optical power level determined by the wavelength division multiplexing optical transmission system. Details of the individual channel optical level equalizer unit 55 will be described later. The signal light wave with its optical power level being adjusted by the individual channel optical level equalizer unit 55 is sent to the multiplexing functional unit 56.

The multiplexing functional unit 56 is a unit for wavelength multiplexing again the signal light waves received from the plurality of the individual channel optical level equalizer units 55. The wavelength division multiplexing signals passing through the wavelength multiplexing by the multiplexing functional unit 56 are sent to the transmitting-side optical amplifier unit 6 as they are via the connection optical cord 12.

The transmitting-side optical amplifier unit 6 is a unit for compensating for the loss in the node equipment 1 with respect to the wavelength division multiplexing signals which are received from the optical multiplexer/demultiplexer unit 5 via the signal optical cord 12 and are to be transmitted to a transmission path 102. The transmitting-side optical amplifier unit 6 comprises a transmitting-side optical amplification functional unit (TXAMP) 61 and an amplifier unit control circuit 62.

The transmitting-side optical amplification functional unit 61 is a unit for optically amplifying the wavelength division multiplexing signals received from the optical multiplexer/demultiplexer unit 5 in accordance with the control of the amplifier unit control circuit 62. The wavelength division multiplexing signals optically amplified by the transmitting-side optical amplification functional unit 61 are sent to a downstream node equipment (not shown) via the transmission path 102.

The amplifier unit control circuit 62 is a unit for controlling the optical amplification of the transmitting-side optical amplification functional unit 61. The amplifier unit control circuit 62 controls the optical amplification of the transmitting-side optical amplification functional unit 61 by carrying out AGC or APC. In addition, it can also switch its control method.

Figure 2:
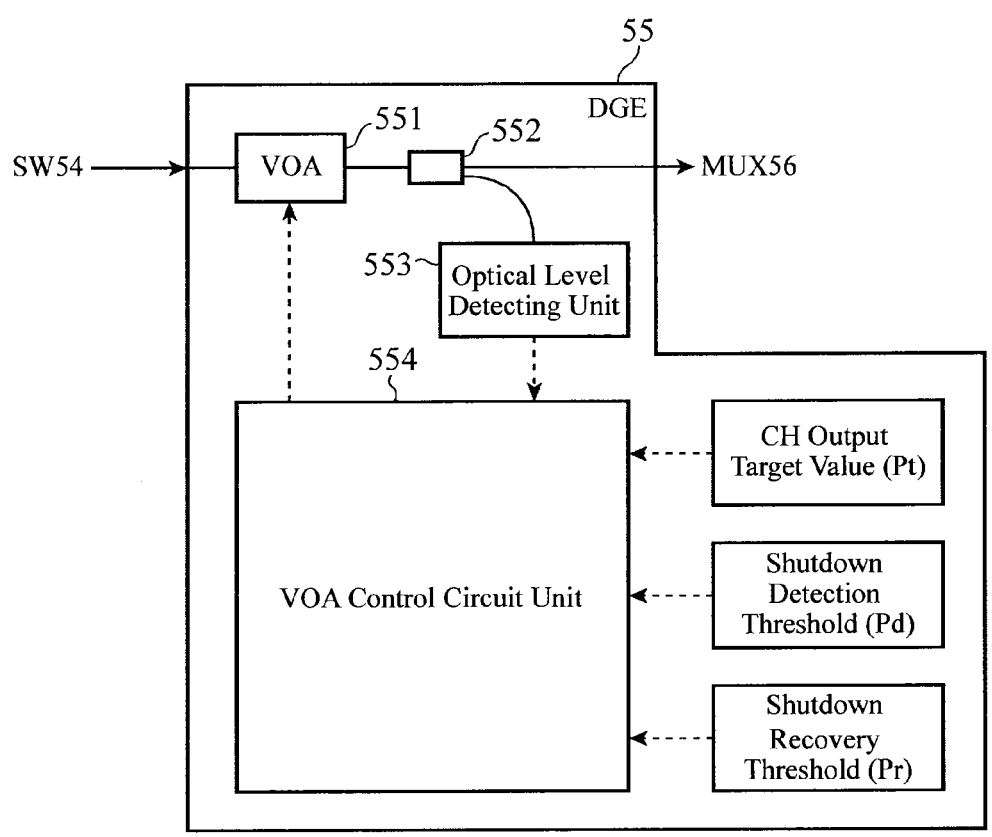
FIG. 2 is a block diagram showing a configuration of an individual channel optical level equalizer unit of the embodiment 1 in accordance with the present invention.
Figure 3:
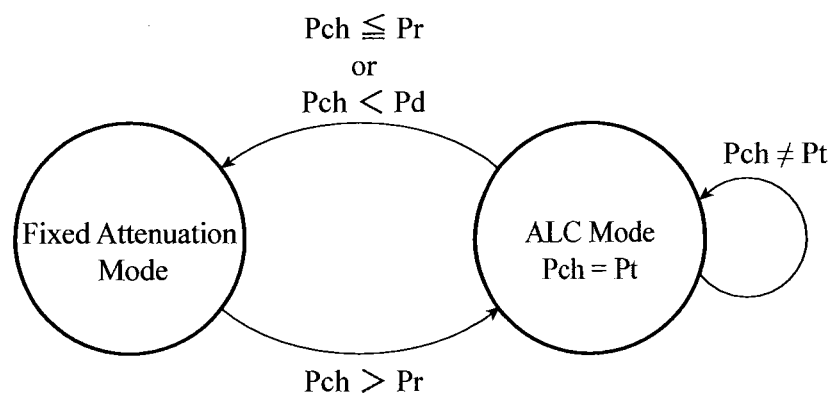
FIG. 3 is a diagram illustrating a control state transition of the VOA control circuit unit of the embodiment 1 in accordance with the present invention.

Next, a configuration of the individual channel optical level equalizer unit 55 will be described. FIG. 2 is a block diagram showing a configuration of the individual channel optical level equalizer unit 55 of the embodiment 1 in accordance with the present invention, and FIG. 3 is a diagram illustrating a control state transition of a VOA control circuit unit 554 of the embodiment 1 in accordance with the present invention.

As shown in FIG. 2, the individual channel optical level equalizer unit 55 comprises a variable optical attenuator unit (VOA) 551, an optical branching coupler 552, an optical level detecting unit 553 and the VOA control circuit unit (control unit) 554.

The variable optical attenuator unit 551 is a unit for adjusting the optical power level of the signal light wave received from the individual channel optical switch functional unit 54 to a preset CH output target value (Pt) in accordance with the control of the VOA control circuit unit 554. The signal light wave with its optical power level being adjusted by the variable optical attenuator unit 551 is sent to the optical branching coupler 552.

The optical branching coupler 552 is for optically branching the signal light wave with its optical power level being adjusted by the variable optical attenuator unit 551. A first part of the signal light wave optically branched by the optical branching coupler 552 is transmitted to the multiplexing functional unit 56 and the second part of the signal light wave is sent to the optical level detecting unit 553.

The optical level detecting unit 553 is a unit for periodically detecting and observing the optical power level (absolute value) of the signal light wave optically branched by the optical branching coupler 552. The detection result of the optical power level (Pch) by the optical level detecting unit 553 is sent to the VOA control circuit unit 554.

The VOA control circuit unit 554 is a unit for comparing the detection result (Pch) by the optical level detecting unit 553 with the preset CH output target value (Pt), shutdown detection threshold (Pd) and shutdown recovery threshold (Pr) to control the optical attenuation of the variable optical attenuator unit 551.

Incidentally, the shutdown recovery threshold (Pr) is set at the optical power level obtained when the minimum optical power level at the normal operation is supplied from the individual channel optical switch functional unit 54 and is optically attenuated by the fixed loss of the variable optical attenuator unit 551. In addition, the shutdown detection threshold (Pd) is set at the optical power level that disenables the normal operation by detecting the optical power level reduction in the ALC mode.

Here, the VOA control circuit unit 554, which is assumed to operate in the control state transition as shown in FIG. 3, compares the optical power level (Pch) supplied from the optical level detecting unit 553 with the shutdown recovery threshold (Pr), and operates in the fixed attenuation mode when Pch≤Pr. In the fixed attenuation mode, to prevent an unnecessary signal light wave from being delivered to the downstream multiplexing functional unit 56, the VOA control circuit unit 554 increases the optical attenuation of the variable optical attenuator unit 551 in accordance with the system.

On the other hand, when Pch>Pr, the VOA control circuit unit 554 operates in the ALC (Automatic-Level Control) mode. In the ALC mode, the VOA control circuit unit 554 carries out ALC of the optical attenuation of the variable optical attenuator unit 551 in such a manner that the optical power level (Pch) becomes the CH output target value (Pt).

In addition, when Pch<Pd is detected by comparing the optical power level (Pch) with the shutdown detection threshold (Pd), the VOA control circuit unit 554 decides that a break of the optical input of the channel (CH) occurs, and operates in the fixed attenuation mode.

Incidentally, as for the shutdown detection threshold (Pd) and the shutdown recovery threshold (Pr), there are some cases where the shutdown recovery threshold (Pr) becomes smaller depending on the loss in the fixed attenuation mode. In such a case, time protection is provided for the transition from the ALC mode to the fixed attenuation mode.

Figure 4:
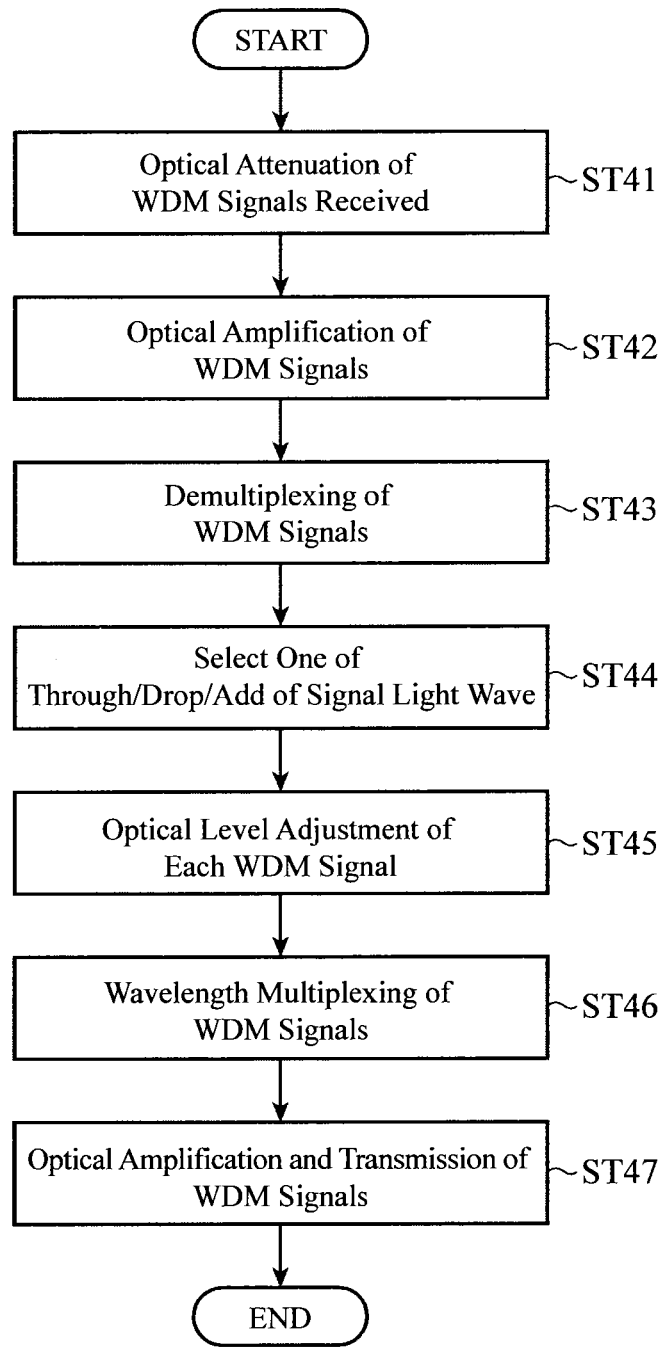
FIG. 4 is a flowchart showing the main operation of the node equipment of the embodiment 1 in accordance with the present invention.

Next, the main operation of the node equipment 1 with the foregoing configuration will be described. FIG. 4 is a flowchart showing the main operation of the node equipment 1 of the embodiment 1 in accordance with the present invention.

In the main operation of the node equipment 1 as shown in FIG. 4, the variable optical attenuator unit 21 in the receiving-side optical amplifier unit 2 optically attenuates the wavelength division multiplexing signals received from the upstream node equipment via the transmission path 101 in accordance with the control of the attenuator unit control circuit 26 (step ST41). The wavelength division multiplexing signals optically attenuated by the variable optical attenuator unit 21 are sent to the receiving-side optical amplification functional unit 22.

Subsequently, the receiving-side optical amplification functional unit 22 optically amplifies the wavelength division multiplexing signals optically attenuated by the variable optical attenuator unit 21 in accordance with the control of the amplifier unit control circuit 27 (step ST42). The wavelength division multiplexing signals optically amplified by the receiving-side optical amplification functional unit 22 are sent to the demultiplexing functional unit 53 in the optical multiplexer/demultiplexer unit 5 via the optical branching coupler 23, connection optical cord 11 and optical branching coupler 51.

Subsequently, the demultiplexing functional unit 53 demultiplexes the wavelength division multiplexing signals received from the receiving-side optical amplification functional unit 22 via the optical branching coupler 23, connection optical cord 11 and optical branching coupler 51 into individual wavelengths (step ST43). Each of the signal light waves demultiplexed into the individual wavelengths by the demultiplexing functional unit 53 is sent to the individual channel optical switch functional unit 54 corresponding to its wavelength.

The individual channel optical switch functional unit 54 selects one of the Through/Drop/Add of the signal light wave (step ST44). Here, when the individual channel optical switch functional unit 54 is set at Through, it sends the signal light wave demultiplexed by the demultiplexing functional unit 53 as it is to the individual channel optical level equalizer unit 55. Besides, when the individual channel optical switch functional unit 54 is set at Drop, it transmits the signal light wave demultiplexed by the demultiplexing functional unit 53 to the signal receiver unit 4 via the connection optical cord 14. In addition, when the individual channel optical switch functional unit 54 is set at Add, it sends the signal light wave received from the signal transmitter unit 3 via the connection optical cord 13 to the individual channel optical level equalizer unit 55.

Subsequently, the individual channel optical level equalizer unit 55 automatically adjusts the optical power level of the signal light wave received from the individual channel optical switch functional unit 54 to the target optical power level determined by the wavelength division multiplexing optical transmission system (step ST45). The signal light wave with its optical power level being adjusted by the individual channel optical level equalizer unit 55 is sent to the multiplexing functional unit 56.

Subsequently, the multiplexing functional unit 56 carries out wavelength multiplexing of the signal light waves received from the plurality of individual channel optical level equalizer units 55 again (step ST46). The wavelength division multiplexing signals passing through the wavelength multiplexing by the multiplexing functional unit 56 are sent to the transmitting-side optical amplifier unit 6 via the connection optical cord 12.

Subsequently, the transmitting-side optical amplification functional unit 61 in the transmitting-side optical amplifier unit 6 optically amplifies the wavelength division multiplexing signals received from the optical multiplexer/demultiplexer unit 5 in accordance with the control of the amplifier unit control circuit 62, and transmits to the downstream node equipment via the transmission path 102 (step ST47).

Figure 5:
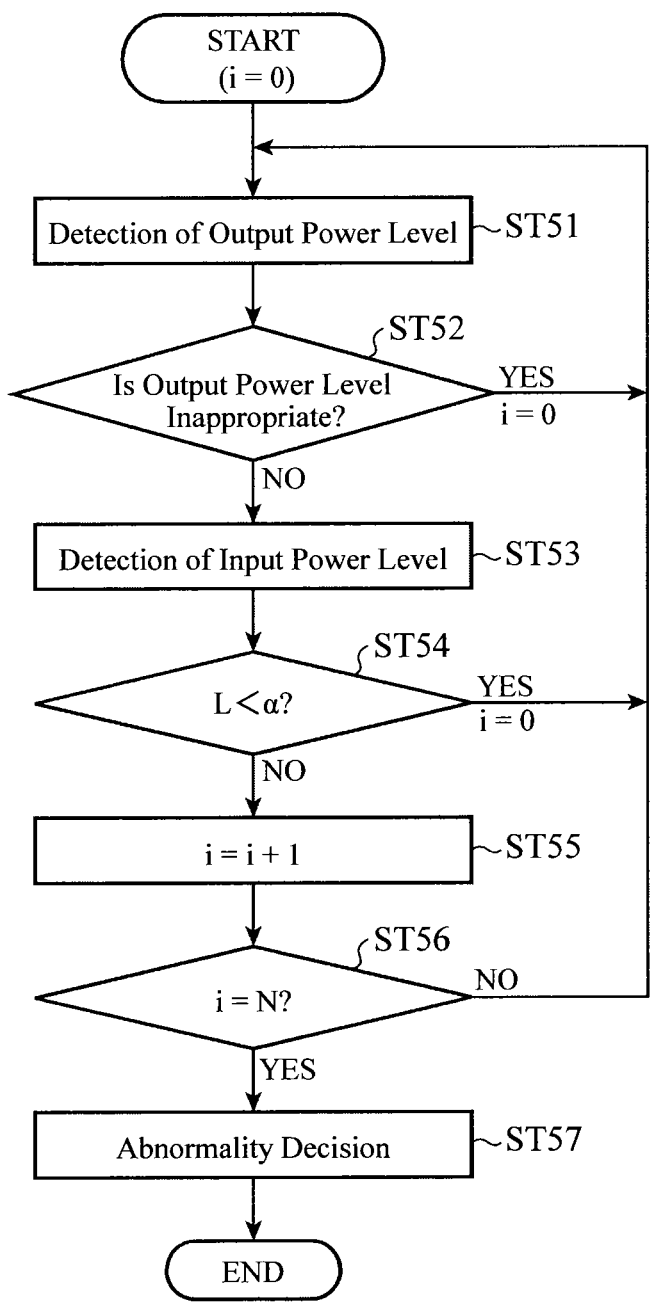
FIG. 5 is a flowchart showing the abnormality decision operation of the node equipment of the embodiment 1 in accordance with the present invention.

Next, the abnormality decision operation of the node equipment 1 will be described. FIG. 5 is a flowchart showing the operation of the abnormality decision operation of the node equipment 1 of the embodiment 1 in accordance with the present invention.

As shown in FIG. 5, in the abnormality decision operation of the node equipment 1, the output level detecting circuit 24 decides the total optical power level of the wavelength division multiplexing signals optically branched by the optical branching coupler 23 (the output power level of the receiving-side optical amplifier unit 2) (step ST51). The detection result of the optical power level (Prx_out) by the output level detecting circuit 24 is sent to the deciding circuit 25.

Subsequently, the deciding circuit 25 confirms whether the output power level of the receiving-side optical amplification functional unit 22 is appropriate or not from the detection result of the optical power level (Prx_out) of the output level detecting circuit 24 (step ST52). For example, when the receiving-side optical amplification functional unit 22 carries out a shutdown such as stopping light emission of its excitation LD, it cannot carry out optical amplification and its output power level is reduced. When the output power level is low, the detection accuracy of the optical power levels of the output level detecting circuit 24 and input level detecting circuit 52 deteriorate so that the loss cannot be checked correctly.

At this step ST52, if the deciding circuit 25 makes a decision that the output power level of the receiving-side optical amplification functional unit 22 is inappropriate (the output stopped state of the receiving-side optical amplification functional unit 22), then it sets the abnormality detection count i at zero. After that, the sequence returns to step ST51.

On the other hand, at step ST52, when the deciding circuit 25 decides that the output power level of the receiving-side optical amplification functional unit 22 is appropriate, then the input level detecting circuit 52 decides the total optical power level of the wavelength division multiplexing signals optically branched by the optical branching coupler 51 (the input level to the optical multiplexer/demultiplexer unit 5) (step ST53). The detection result of the optical power level (Padm_in) by the output level detecting circuit 24 is sent to the deciding circuit 25.

Subsequently, the deciding circuit 25 calculates the loss (L) of the optical power level through the connection optical cord 11 by comparing the detection result of the optical power level (Prx_out) by the output level detecting circuit 24 with the detection result of the optical power level (Padm_in) by the input level detecting circuit 52, and compares the loss L with a preset abnormality detection threshold ($\alpha$) (step ST54). Here, the abnormality detection threshold ($\alpha$), which is set within the difference between the normal output power level during the input of the maximum number of wavelengths to the transmitting-side optical amplification functional unit 61 and its maximum saturation output level, is determined by considering the optical connector loss of the connection optical cord 11 in the normal state (about 0.2-0.4 dB in terms of effective value across both ends) and monitoring errors of the output level detecting circuit 24 and input level detecting circuit 52.

When the loss (L) is less than the abnormality detection threshold ($\alpha$) at this step ST54, the deciding circuit 25 makes a decision of the normal loss and sets the abnormality detection count i at zero. After that, the sequence returns to step ST51.

On the other hand, if the loss (L) is not less than the abnormality detection threshold ($\alpha$) at this step ST54, the deciding circuit 25 makes a decision of the abnormal loss, and increments the abnormality detection count i by one (step ST55).

Subsequently, the deciding circuit 25 makes a decision on whether it detects the abnormal loss N consecutive times or not by deciding on whether the abnormality detection count i is equal to a preset threshold N (step ST56).

At this step ST56, if the deciding circuit 25 does not decide that it detects the abnormal loss N consecutive times, the sequence returns to step ST51.

On the other hand, if the deciding circuit 25 decides that it detects the abnormal loss N consecutive times at step ST56, it makes a final decision that the loss (L) of the optical power level through the connection optical cord 11 is in the abnormal state (step ST57). After that, the deciding circuit 25 notifies the attenuator unit control circuit 26 of that, and increases the optical attenuation of the variable optical attenuator unit 21.

Figure 6:
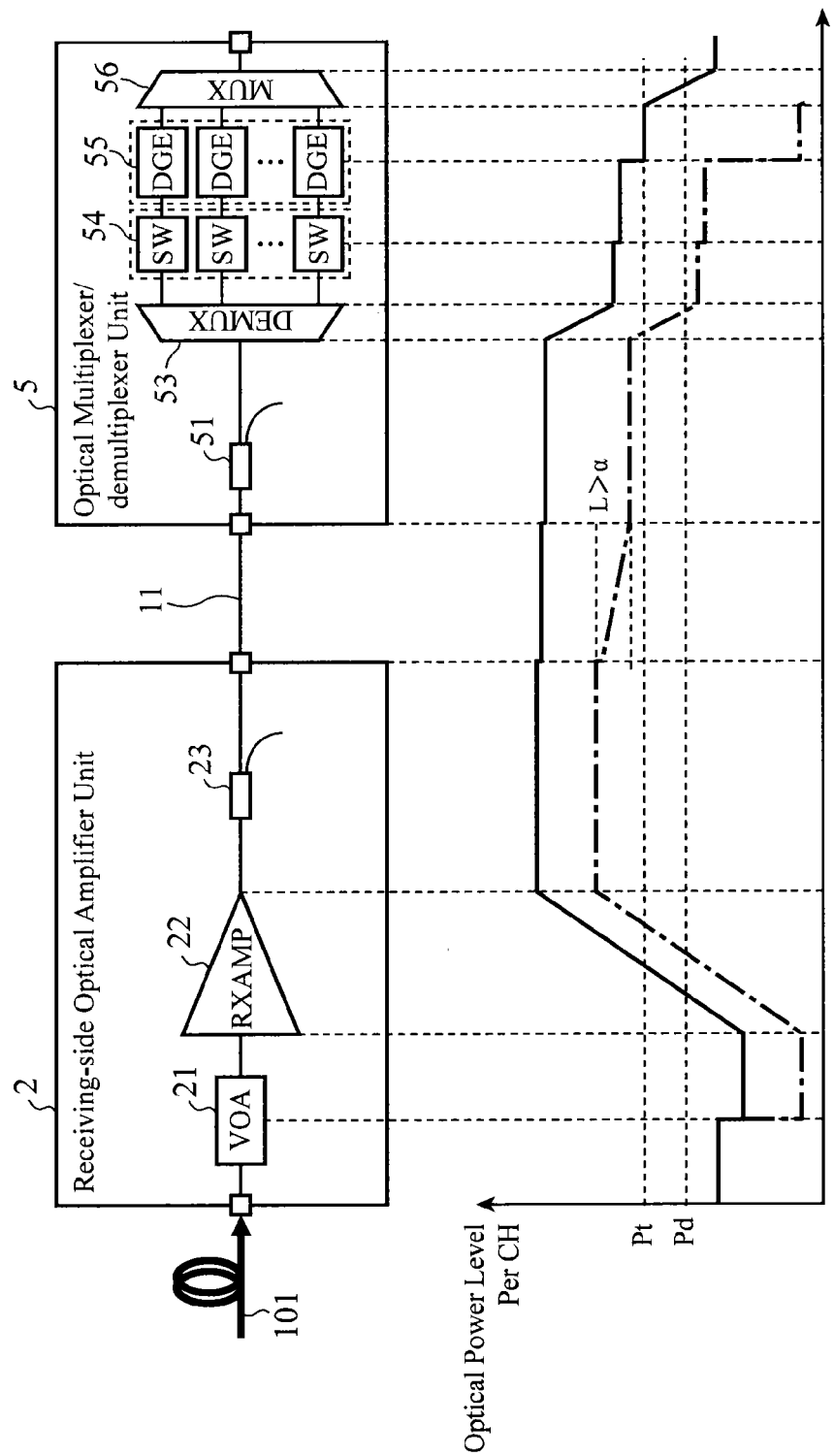
FIG. 6 is an optical power level diagram of the node equipment of the embodiment 1 in accordance with the present invention.

FIG. 6 is an optical power level diagram of the node equipment 1 of the embodiment 1 in accordance with the present invention. In FIG. 6, the solid line shows an optical power level diagram per wavelength at normal times and the dash dotted line shows an optical power level diagram at abnormal times when an excessive loss occurs in the connection optical cord 11. Incidentally, as for the optical attenuation of the variable optical attenuator unit 21 in the fixed attenuation mode of the attenuator unit control circuit 26, it is set in advance in such a manner as to cause the output power level of the individual channel optical level equalizer unit 55 to become less than the shutdown detection threshold (Pd).

As shown in FIG. 6, when an excessive loss occurs in the connection optical cord 11, increasing the optical attenuation of the variable optical attenuator unit 21 enables the individual channel optical level equalizer unit 55 to reduce its output power level to less than the shutdown detection threshold (Pd). Thus the VOA control circuit unit 554 makes a transition to the fixed attenuation mode, thereby being able to increase the optical attenuation of the variable optical attenuator unit 551.

As a result, when an abnormality occurs in the connection optical cord 11, the optical power level of the signal light wave with the Through wavelength cannot exceed the shutdown detection threshold (Pd). Accordingly, it can suppress the excessive input to the transmitting-side optical amplifier unit 6, and prevent the gain saturation of the transmitting-side optical amplification functional unit 61.

Figure 7:
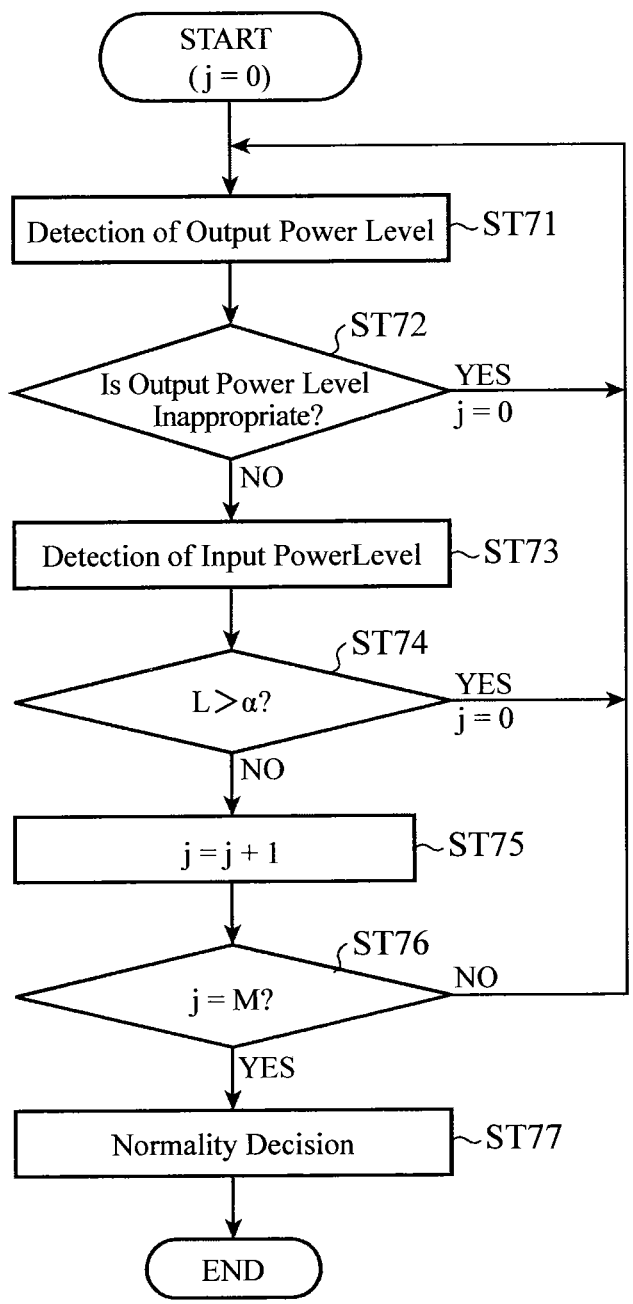
FIG. 7 is a flowchart showing the normality decision operation of the node equipment of the embodiment 1 in accordance with the present invention.

Next, the normality decision operation of the node equipment 1 will be described. FIG. 7 is a flowchart showing the normality decision operation of the node equipment 1 of the embodiment 1 in accordance with the present invention.

The normality decision operation of the node equipment 1 shown in FIG. 7 differs from the abnormality decision operation shown in FIG. 5 in that the abnormality detection count i is changed to a normality detection count j, and the operation at step ST54 forward is altered. The operation from step ST74 forward will be described below.

At step ST74, the deciding circuit 25 calculates the loss (L) of the optical power level through the connection optical cord 11 by comparing the detection result of the optical power level (Prx_out) by the output level detecting circuit 24 with the detection result of the optical power level (Padm_in) by the input level detecting circuit 52, and compares the loss L with the preset abnormality detection threshold (α) (step ST74).

At this step ST74, if the loss (L) of the optical power level is greater than the abnormality detection threshold (α), the deciding circuit 25 decides that it is an abnormal loss and sets the normality detection count j at zero. After that, the sequence returns to step ST71.

On the other hand, if the loss (L) of the optical power level is less than the abnormality detection threshold (α) at this step ST74, the deciding circuit 25 decides that it is a normal loss and increments the normality detection count j (step ST75).

Subsequently, the deciding circuit 25 makes a decision on whether it detects the normal loss M consecutive times or not by deciding on whether the normality detection count j is equal to a preset threshold M (step ST76).

At this step ST76, if the deciding circuit 25 does not decide that it detects the normal loss M consecutive times, the sequence returns to step ST71.

On the other hand, if the deciding circuit 25 decides that it detects the normal loss M consecutive times at step ST76, it makes a final decision that the loss (L) of the optical power level through the connection optical cord 11 is in the normal state (step ST77). Subsequently, the deciding circuit 25 notifies the attenuator unit control circuit 26 of that, and returns the optical attenuation of the variable optical attenuator unit 21 to the normal value.

This will return the optical power level diagram to that shown by the solid line in FIG. 6 and restart the service of the signal light wave with the Through wavelength. Incidentally, setting the time constant of the transition greater enough than the response rate of the individual channel optical level equalizer unit 55 makes it possible to suppress a transient response of the output power level of the individual channel optical level equalizer unit 55 and to prevent the excessive output in its output power level.

As described above, according to the embodiment 1, it is configured in such a manner that it calculates the loss from the difference between the input and output power levels of the connection optical cord 11, and that when it decides that an excessive loss occurs in the connection optical cord 11, it increases the optical attenuation of the variable optical attenuator unit 21. Accordingly, even if an abnormality occurs in the connection optical cord 11 in the node equipment 1 during maintenance of the system, the present embodiment 1 can prevent the signal light wave, the optical power level of which sharply increases, from being transmitted to the transmitting-side optical amplifier unit 6. As a result, it can avoid the gain saturation, thereby being able to ensure the signal quality of Add wavelength and to construct an inexpensive, highly reliable system.

Embodiment 2

Figure 8:
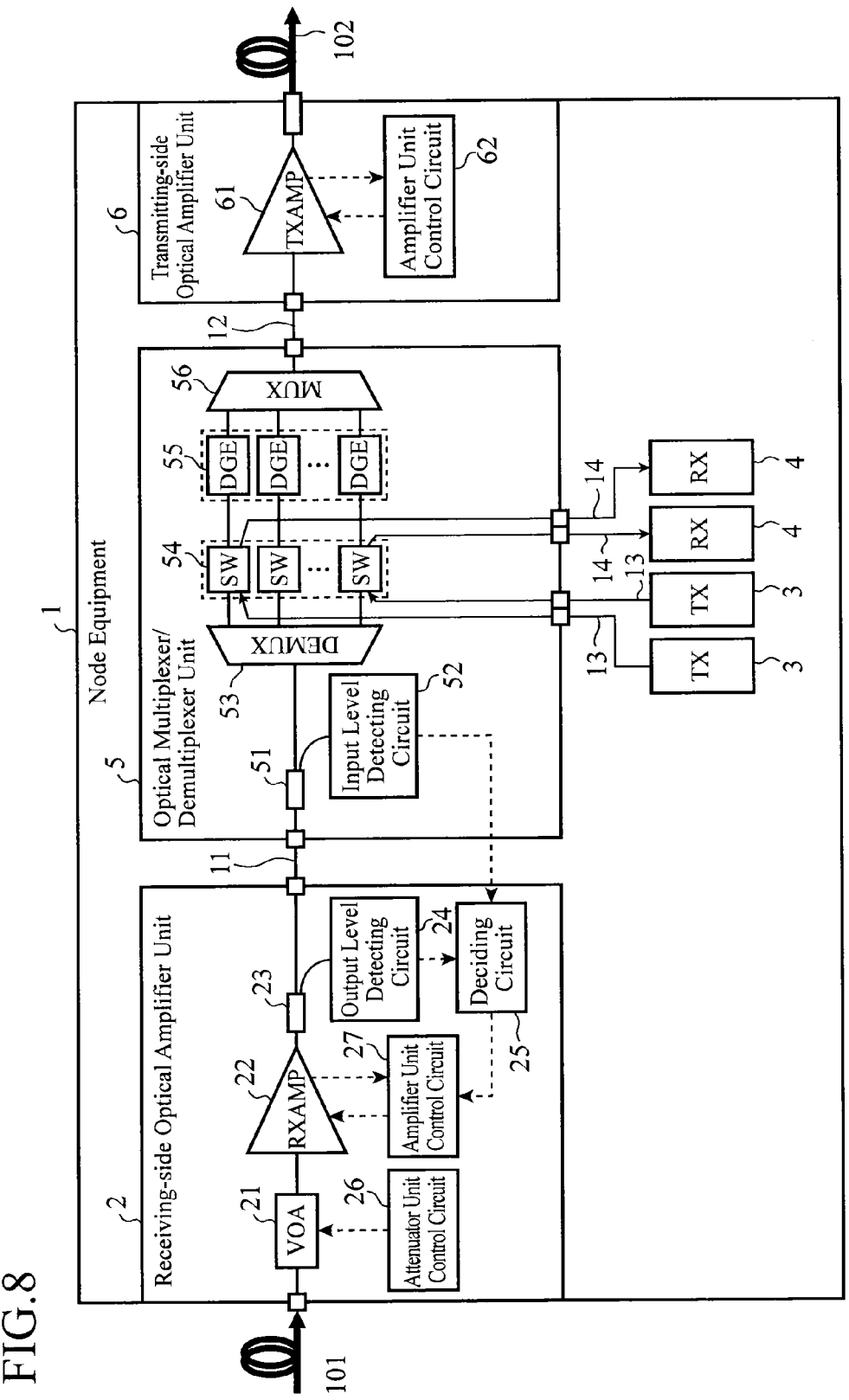
FIG. 8 is a block diagram showing a configuration of the node equipment of an embodiment 2 in accordance with the present invention.

FIG. 8 is a block diagram showing a configuration of the node equipment 1 of an embodiment 2 in accordance with the present invention. Although the configuration of the node equipment 1 of the embodiment 2 shown in FIG. 8 is basically the same as that of the node equipment 1 of the embodiment 1 shown in FIG. 1, it differs in the processing contents of the deciding circuit 25 and amplifier unit control circuit 27. Only the different points will be described below.

Incidentally, as for the abnormality decision operation and normality decision operation of the node equipment 1 of the embodiment 2, since they are the same as the abnormality decision operation and normality decision operation of the node equipment 1 of the embodiment 1 shown in FIGS. 5 and 7, their description will be omitted.

When the deciding circuit 25 decides that the loss (L) of the optical power level is in the abnormal state, it notifies the amplifier unit control circuit 27 of that (abnormality decision notification), and reduces the optical amplification of the receiving-side optical amplification functional unit 22. In addition, when the deciding circuit 25 decides that the loss (L) of the optical power level is returned to the normal state, it notifies the amplifier unit control circuit 27 of that (normality decision notification), and returns the optical amplification of the receiving-side optical amplification functional unit 22 to the normal value.

When the amplifier unit control circuit 27 receives the abnormality decision notification from the deciding circuit 25, it carries out APC and reduces the optical amplification of the receiving-side optical amplification functional unit 22. In contrast, when it receives the normality decision notification from the deciding circuit 25, it returns the optical amplification to the normal value by carrying out AGC in such a manner as to maintain the ratio (gain) between the total input level and total output level of the receiving-side optical amplification functional unit 22 at constant.

Figure 9:
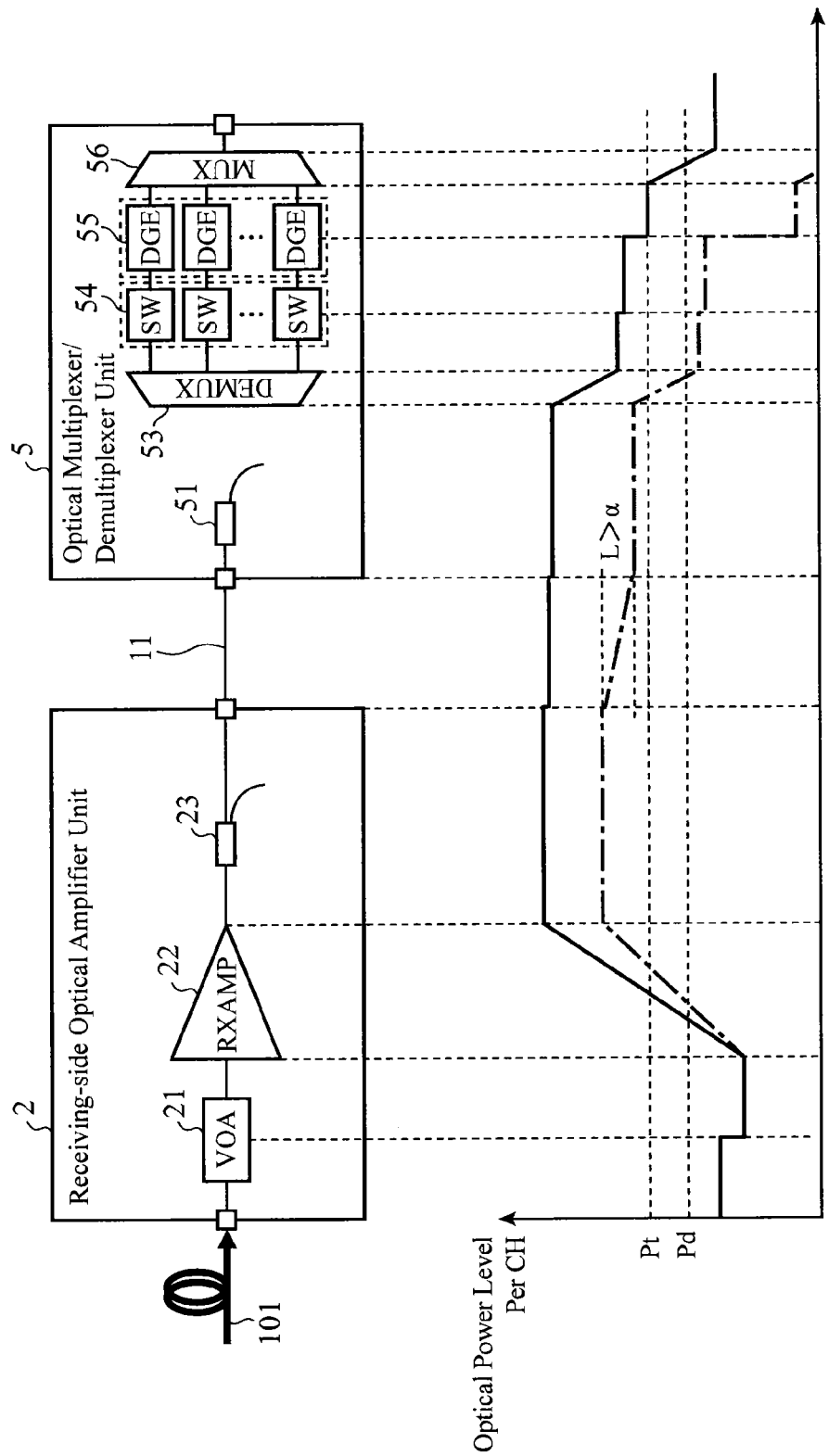
FIG. 9 is an optical power level diagram of the node equipment of the embodiment 2 in accordance with the present invention.

FIG. 9 is an optical power level diagram of the node equipment 1 of the embodiment 2 in accordance with the present invention. In FIG. 9, the solid line shows an optical power level diagram per wavelength at normal times and the dash dotted line shows an optical power level diagram at abnormal times when an excessive loss occurs in the connection optical cord 11. Incidentally, as for the optical amplification of the receiving-side optical amplifier unit 22 while the amplifier unit control circuit 27 carries out the APC, it is set in advance in such a manner as to cause the output power level of the individual channel optical level equalizer unit 55 to become less than the shutdown detection threshold (Pd).

As shown in FIG. 9, when an excessive loss occurs in the connection optical cord 11, reducing the optical amplification of the receiving-side optical amplifier unit 22 enables the individual channel optical level equalizer unit 55 to reduce its output power level to less than the shutdown detection threshold (Pd). Thus the VOA control circuit unit 554 makes a transition to the fixed attenuation mode, thereby being able to increase the optical attenuation of the variable optical attenuator unit 551.

As described above, according to the embodiment 2, it is configured in such a manner that it calculates the loss from the difference between the input and output power levels of the connection optical cord 11, and that when it decides that an excessive loss occurs in the connection optical cord 11, it reduces the optical amplification of the receiving-side optical amplifier unit 22. Accordingly, it can achieve the same advantages of the embodiment 1 and implement a system that does not affect the signal quality of the Add wavelength even in the event of a fault in the connection optical cord 11 or during maintenance work.

In addition, although the embodiment 2 is configured in such a manner that when a decision is made that an excessive loss occurs in the connection optical cord 11, it reduces the optical amplification of the receiving-side optical amplifier unit 22, a configuration is also possible which, when a decision is made that an excessive loss occurs in the connection optical cord 11, increases the optical attenuation of the variable optical attenuator unit 21 and reduces the optical amplification of the receiving-side optical amplifier unit 22.

Embodiment 3

Figure 10:
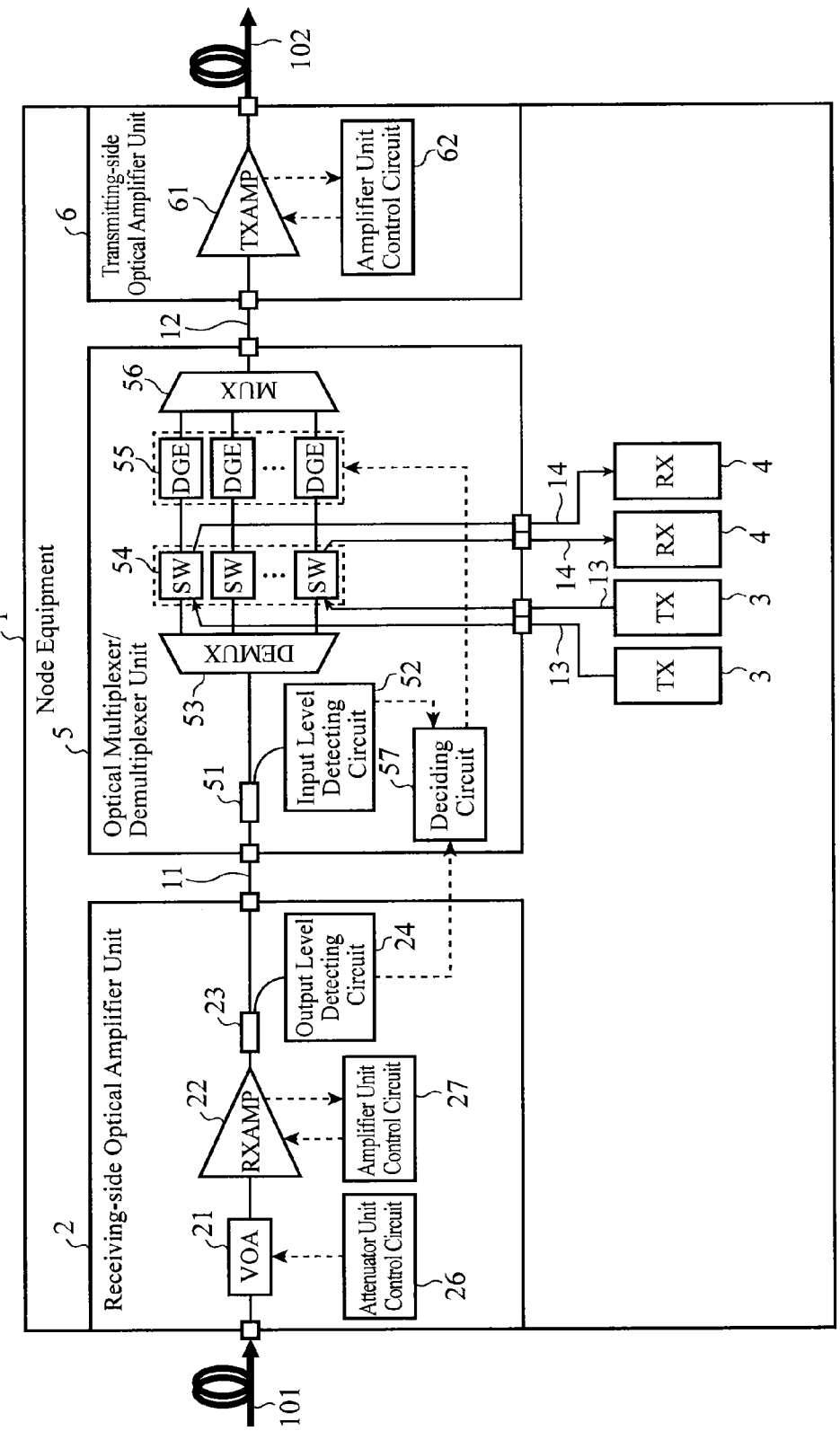
FIG. 10 is a block diagram showing a configuration of the node equipment of an embodiment 3 in accordance with the present invention.
Figure 11:
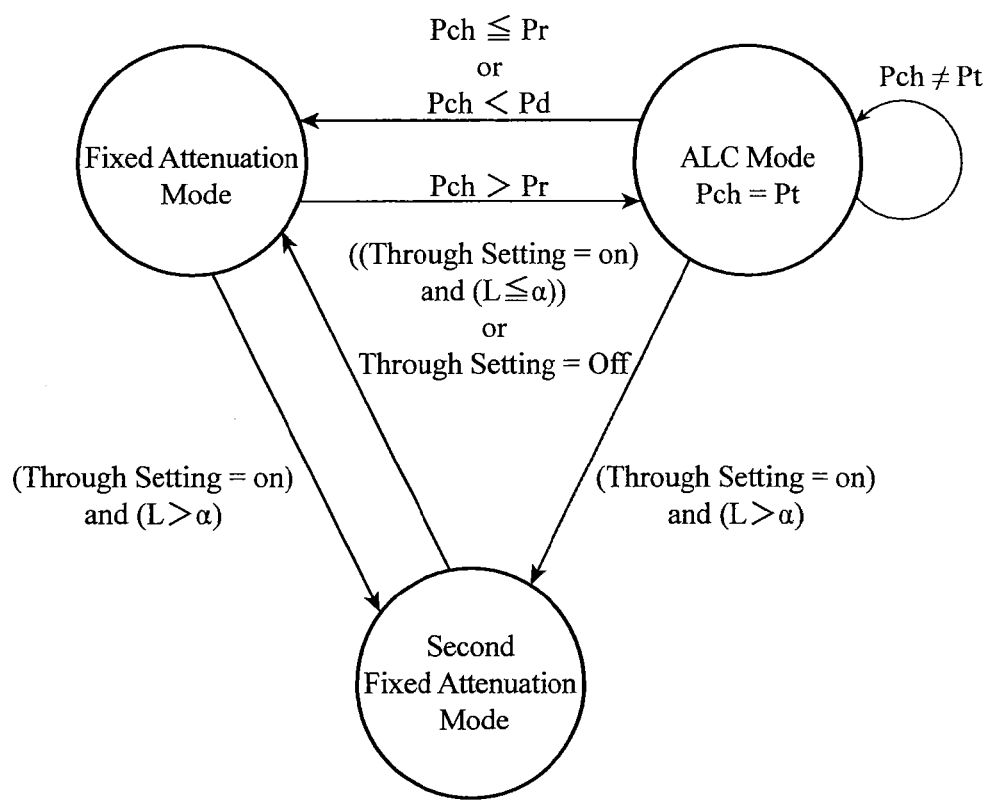
FIG. 11 is a diagram illustrating a control state transition of the VOA control circuit unit of the embodiment 3 in accordance with the present invention.

FIG. 10 is a diagram showing the node equipment 1 of the embodiment 3 in accordance with the present invention, and FIG. 11 is a diagram illustrating a control state transition of the VOA control circuit unit in the embodiment 3 in accordance with the present invention. The node equipment 1 of the embodiment 3 shown in FIG. 10 is configured by removing the deciding circuit 25 from the node equipment 1 of the embodiment 1 shown in FIG. 1 and by adding a deciding circuit (deciding unit) 57. Since the remaining components are the same, they are designated by the same reference numerals and their description will be omitted.

Incidentally, as for abnormality decision operation and normality decision operation of the node equipment 1 of the embodiment 3, since they are the same as the abnormality decision operation and normality decision operation of the node equipment 1 of the embodiment 1 shown in FIGS. 5 and 7 except that the deciding circuit 57 carries out the processing of the deciding circuit 25, their description will be omitted.

The deciding circuit 57 is a unit for calculating the loss of the optical power level (L=Prx_out−Padm_in) through the connection optical cord 11 by comparing the detection result of the optical power level (Prx_out) by the output level detecting circuit 24 with the detection result of the optical power level (Padm_in) by the input level detecting circuit 52, and for deciding as to whether the loss (L) is in the abnormal state or not. When the deciding circuit 57 decides that the loss (L) is in the abnormal state, it notifies the individual channel optical level equalizer unit 55, to which the signal light wave with the Through wavelength is input, of that (abnormality decision notification), and increases the optical attenuation of the variable optical attenuator unit 551.

In addition, after deciding that the loss (L) is in the abnormal state, the deciding circuit 57 calculates the loss (L) of the optical power level through the connection optical cord 11 by comparing the detection result of the optical power level (Prx_out) by the output level detecting circuit 24 with the detection result of the optical power level (Padm_in) by the input level detecting circuit 52, and decides on whether the loss (L) has been returned to the normal state or not. When the deciding circuit 57 decides that the loss (L) has been returned to the normal state, it notifies the individual channel optical level equalizer unit 55, to which the signal light wave with the Through wavelength is input, of that (normality decision notification), and returns the optical attenuation of the variable attenuator unit 551 to the normal value.

In addition, when the previous stage individual channel optical switch functional unit 54 is set at Through and when receiving the abnormality decision notification from the deciding circuit 57, the VOA control circuit unit 554 operates in a second fixed attenuation mode as shown in FIG. 11. In the second fixed attenuation mode, the VOA control circuit unit 554 increases the optical attenuation of the variable optical attenuator unit 551 in accordance with the system.

On the other hand, the VOA control circuit unit 554 makes a transition from the second fixed attenuation mode to the fixed attenuation mode when the previous stage individual channel optical switch functional unit 54 is set at Through setting and when receiving the normality decision notification from the deciding circuit 57. In addition, it also makes a transition to the fixed attenuation mode when the previous stage individual channel optical switch functional unit 54 makes a transition to the Add setting or Drop setting other than the Through setting.

Figure 12:
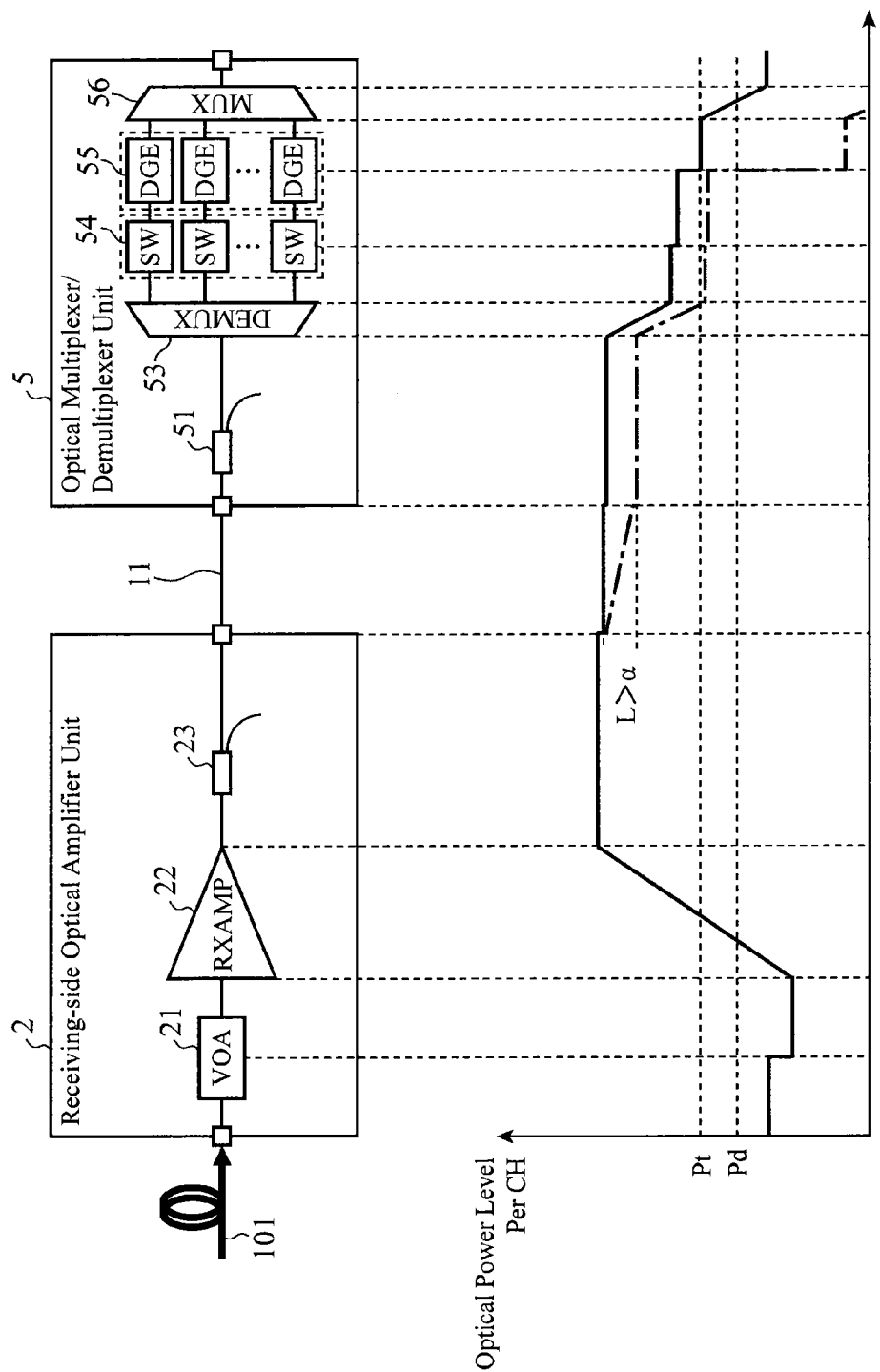
FIG. 12 is an optical power level diagram of the node equipment of the embodiment 3 in accordance with the present invention.

FIG. 12 is an optical power level diagram of the node equipment 1 of the embodiment 3 in accordance with the present invention. In FIG. 12, the solid line shows an optical power level diagram per wavelength at normal times and the dash dotted line shows an optical power level diagram at abnormal times when an excessive loss occurs in the connection optical cord 11.

As shown in FIG. 12, when an excessive loss occurs in the connection optical cord 11, it can cause the VOA control circuit unit 554 to make the transition to the second fixed attenuation mode, thereby being able to increase the optical attenuation of the variable optical attenuator unit 551.

As described above, according to the embodiment 3, it is configured in such a manner that it calculates the loss from the difference between the input and output power levels of the connection optical cord 11, and increases the optical attenuation of the variable optical attenuator unit 551 when it makes a decision that an excessive loss occurs in the connection optical cord 11 and when the individual channel optical functional unit 54 is set at Through, thereby optically attenuating only the signal light wave that passes through the demultiplexing of the optical multiplexer/demultiplexer unit 5. Accordingly, it can achieve the same advantages of the embodiment 1 and implement a system that does not affect the signal quality of the Add wavelength even in the event of a fault in the connection optical cord 11 or during maintenance work.

Embodiment 4

Figure 13:
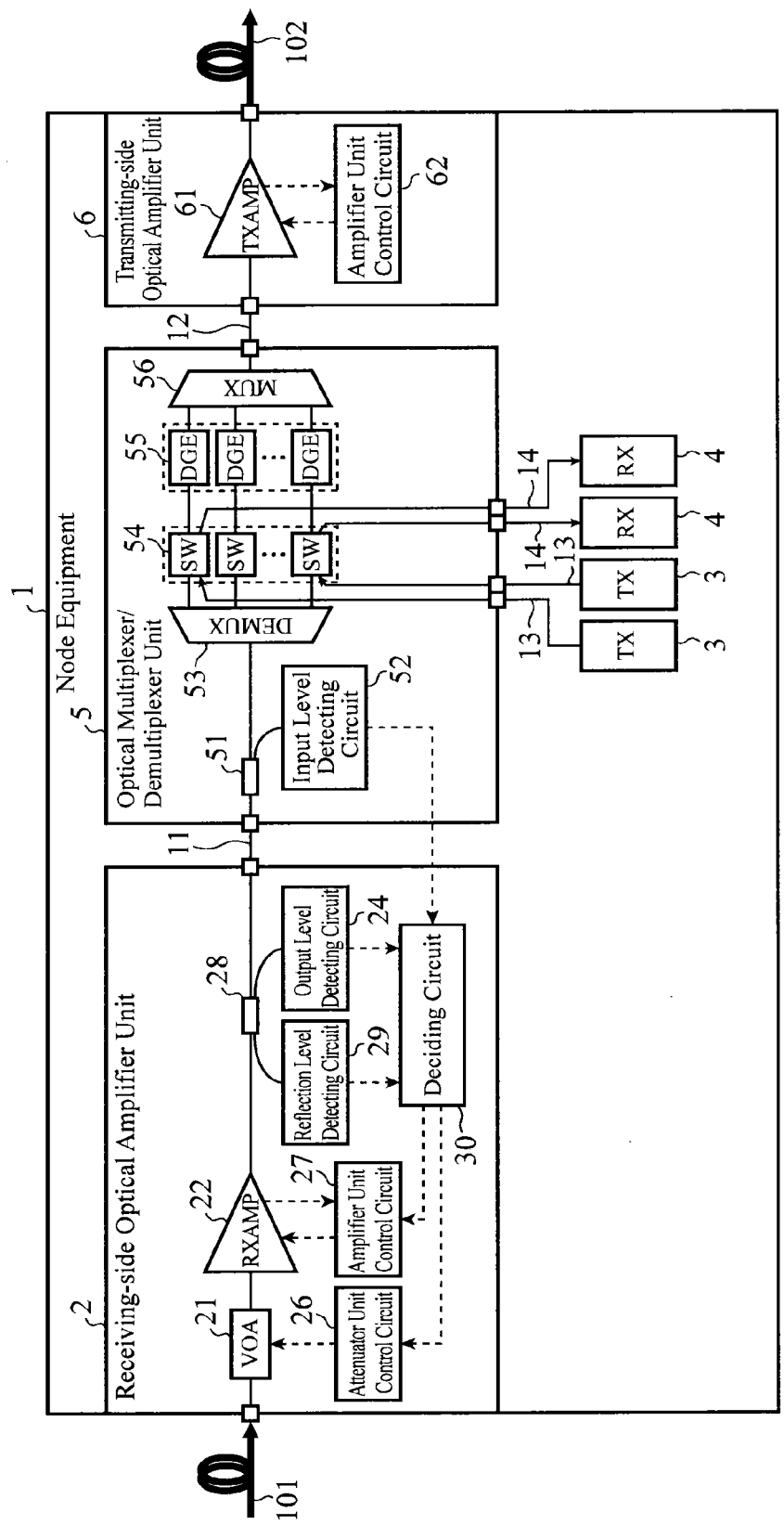
FIG. 13 is a block diagram showing a configuration of the node equipment of an embodiment 4 in accordance with the present invention.

FIG. 13 is a block diagram showing a configuration of the node equipment 1 of an embodiment 4 in accordance with the present invention. The node equipment 1 of the embodiment 4 shown in FIG. 13 is constructed by replacing the optical branching coupler 23 of the node equipment 1 of the embodiment 1 shown in FIG. 1 by an optical branching coupler 28, by adding a reflection level detecting circuit (reflection level detecting unit) 29, and by replacing the deciding circuit 25 by a deciding circuit (deciding unit) 30. Since the remaining components are the same, they are designated by the same reference numerals and their description will be omitted.

The optical branching coupler 28 is for optically branching the wavelength division multiplexing signals optically amplified by the receiving-side optical amplification functional unit 22, and for optically branching reflected light from the output optical connector end face of the receiving-side optical amplifier unit 2. A first part of the wavelength division multiplexing signals optically branched through the optical branching coupler 23 is sent out to the optical multiplexer/demultiplexer unit 5 via the connection optical cord 11, a second part of the wavelength division multiplexing signals is transmitted to the output level detecting circuit 24, and the reflected light is sent to the reflection level detecting circuit 29.

The reflection level detecting circuit 29 is a unit for periodically detecting and observing the total optical power level (absolute value) of the reflected light optically branched through the optical branching coupler 23. The detection result of the optical power level (Prx_ref) by the reflection level detecting circuit 29 is sent to the deciding circuit 30.

The deciding circuit 30 is a unit for calculating the reflection attenuation (D=Prx_ref−Prx_out) by comparing the detection result of the optical power level (Prx_out) by the output level detecting circuit 24 with the detection result of the optical power level (Prx_ref) by the reflection level detecting circuit 29, and for deciding on whether the connection optical cord 11 is in a half extracted state or completely extracted state. When the reflection attenuation (D) exceeds a preset threshold, the deciding circuit 30 decides that the connection optical cord 11 is in the half extracted state or completely extracted state, notifies the attenuator unit control circuit 26 and amplifier unit control circuit 27 of that (abnormality decision notification), and increases the optical attenuation of the variable optical attenuator unit 21 and reduces the optical amplification of the receiving-side optical amplification functional unit 22.

In addition, after deciding that the connection optical cord 11 is in the half extracted state or completely extracted state, the deciding circuit 30 calculates the reflection attenuation (D) by comparing the detection result of the optical power level (Prx_out) by the output level detecting circuit 24 with the detection result of the optical power level (Prx_ref) by the reflection level detecting circuit 29, and decides whether the connection optical cord 11 is in an inserted state or not. When the reflection attenuation (D) is not greater than the preset threshold, the deciding circuit 30 decides that the connection optical cord 11 is in the inserted state, notifies the attenuator unit control circuit 26 and amplifier unit control circuit 27 of that (normality decision notification), and returns the optical attenuation of the variable optical attenuator unit 21 and the optical amplification of the receiving-side optical amplification functional unit 22 to their normal values.

Incidentally, as for the abnormality decision operation and normality decision operation of the node equipment 1 of the embodiment 4, since they are the same as the abnormality decision operation and normality decision operation of the node equipment 1 of the embodiment 1 shown in FIGS. 5 and 7 except that the processing of the input level detecting circuit 52 is replaced by the processing of the reflection level detecting circuit 29, that the processing of the deciding circuit 25 is carried out by the deciding circuit 30, and that the abnormality decision and normality decision of the connection state of the connection optical cord 11 are made according to the reflection attenuation (D) rather than the loss (L), their description will be omitted.

In addition, depending on an application, there are some cases where it controls the variable optical attenuator unit 21 and receiving-side optical amplification functional unit 22 of the receiving-side optical amplifier unit 2 by feeding back the optical power level of the input level detecting circuit 52 of the optical multiplexer/demultiplexer unit 5. If a fault occurs in the connection optical cord 11 in such a state, it is possible that high-energy optical power is output from the receiving-side optical amplifier unit 2. Accordingly, if the optical power level the input level detecting circuit 52 detects is less than a preset threshold, it notifies the deciding circuit 30 of that (input level reduction notification). The deciding circuit 30 which receives the input level reduction notification makes a decision that a fault occurs in the connection optical cord 11, notifies the attenuator unit control circuit 26 and amplifier unit control circuit 27 of that, and controls in such a manner as to prevent the output power level of the receiving-side optical amplifier unit 2 from increasing too much.

Figure 14:
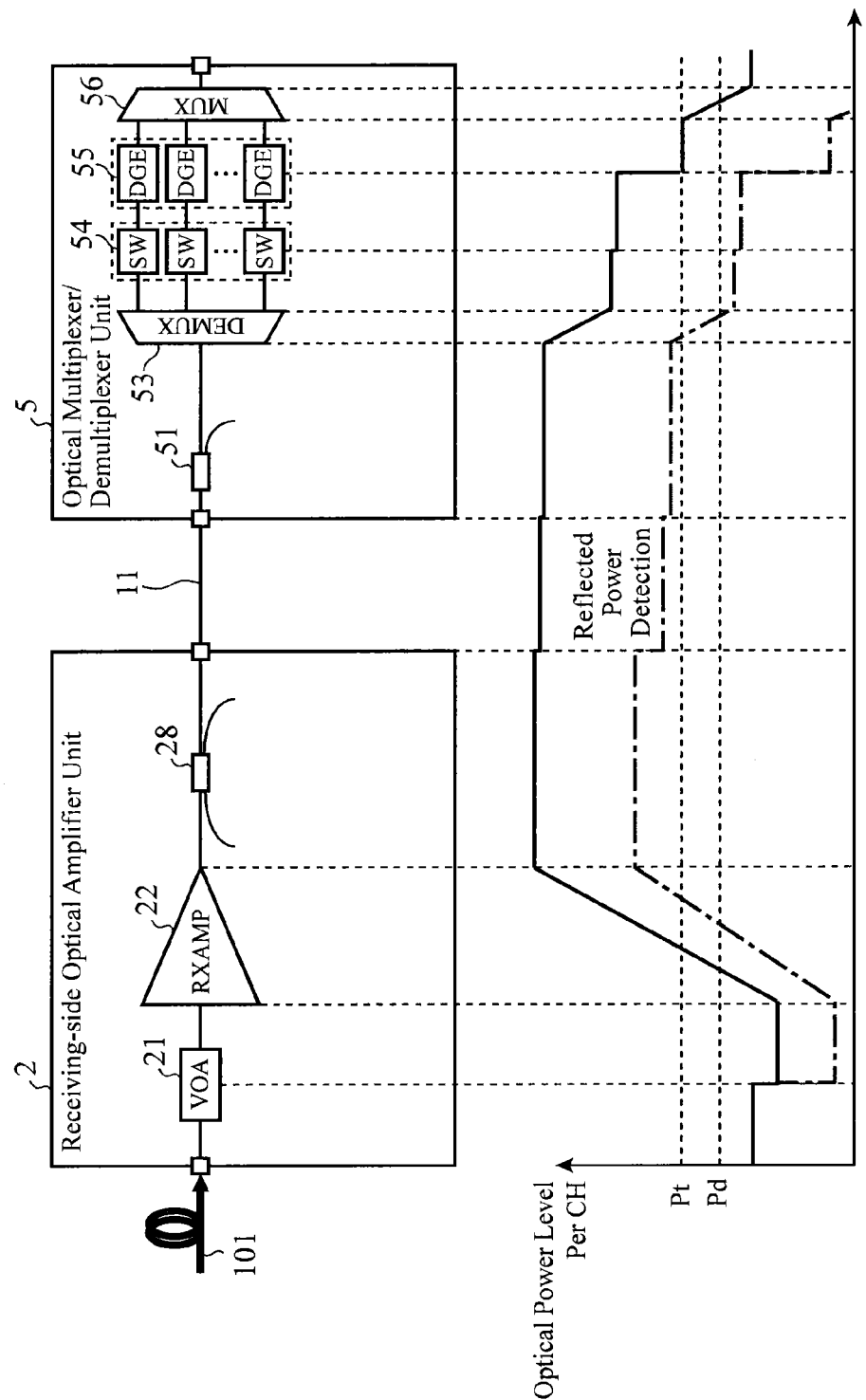
FIG. 14 is an optical power level diagram of the node equipment of the embodiment 4 in accordance with the present invention.

FIG. 14 is an optical power level diagram of the node equipment 1 of the embodiment 4 in accordance with the present invention. In FIG. 14, the solid line shows an optical power level diagram per wavelength at normal times and the dash dotted line shows an optical power level diagram at abnormal times when an excessive loss occurs in the connection optical cord 11. Incidentally, as for the optical attenuation of the variable optical attenuator unit 21 while the attenuator unit control circuit 26 is in the fixed attenuation mode and as for the optical amplification of the receiving-side optical amplifier unit 22 while the amplifier unit control circuit 27 carries out the APC, they are set in advance in such a manner as to cause the output power level of the individual channel optical level equalizer unit 55 to become less than the shutdown detection threshold (Pd).

As shown in FIG. 14, when an excessive loss occurs in the connection optical cord 11, increasing the optical attenuation of the variable optical attenuator unit 21 and reducing the optical amplification of the receiving-side optical amplification functional unit 22 enable the individual channel optical level equalizer unit 55 to reduce its output power level to less than the shutdown detection threshold (Pd). Thus the VOA control circuit unit 554 makes a transition to the fixed attenuation mode, thereby being able to increase the optical attenuation of the variable optical attenuator unit 551.

As described above, according to the embodiment 4, it is configured in such a manner that it calculates the reflection attenuation from the optical power level of the reflected light from the output optical connector end face, and that when it decides that an excessive loss occurs in the connection optical cord 11, it increases the optical attenuation of the variable optical attenuator unit 21 and reduces the optical amplification of the receiving-side optical amplifier unit 22. Accordingly, it can achieve the same advantages of the embodiment 1 and implement a system that does not affect the signal quality of the Add wavelength even in the event of a fault in the connection optical cord 11 or during maintenance work.

Embodiment 5

Figure 15:
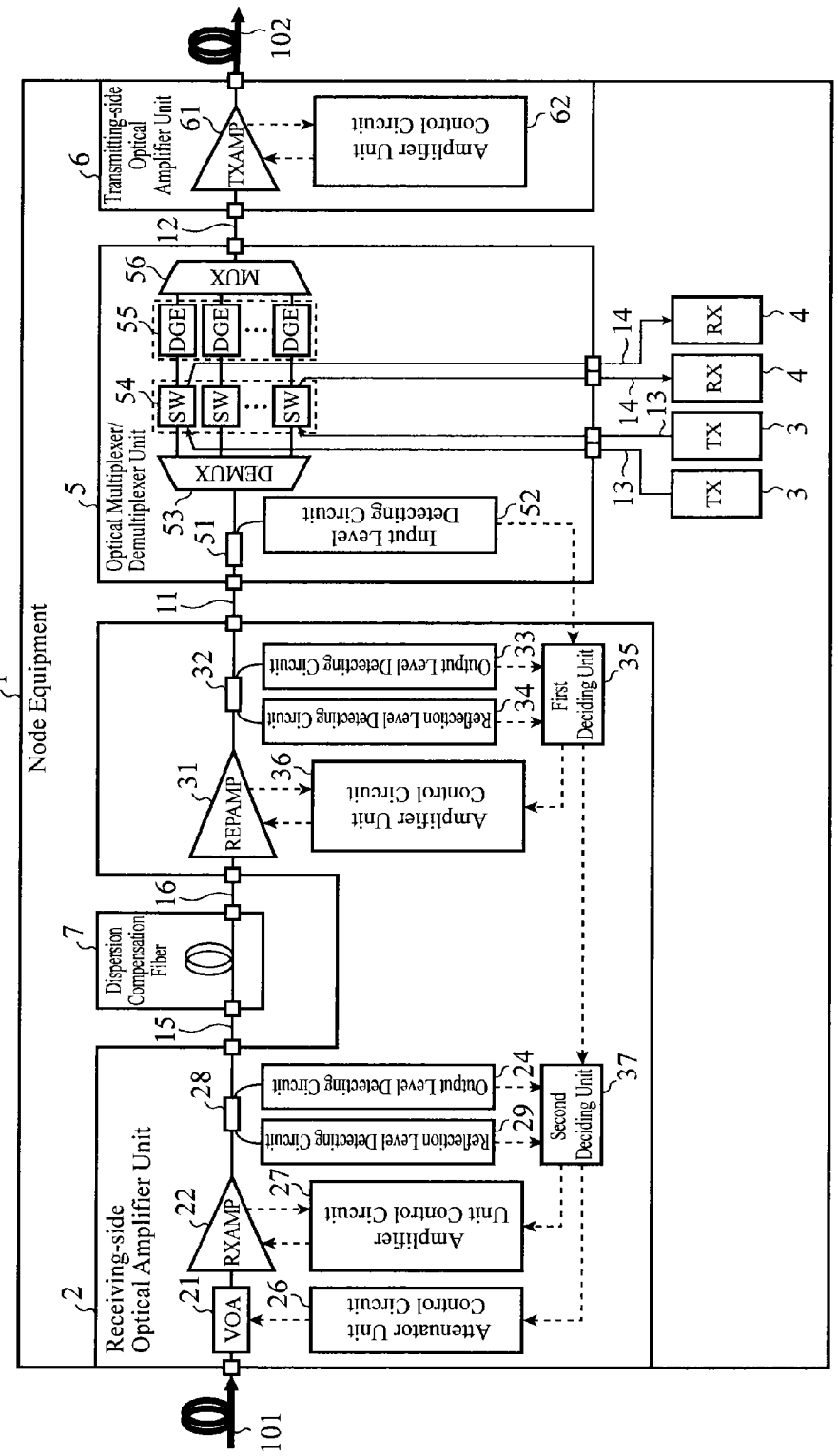
FIG. 15 is a block diagram showing a configuration of the node equipment of an embodiment 5 in accordance with the present invention.

FIG. 15 is a block diagram showing a configuration of the node equipment 1 of an embodiment 5 in accordance with the present invention. The node equipment 1 of the embodiment 5 shown in FIG. 15 is constructed by adding to the node equipment 1 of the embodiment 4 shown in FIG. 13 an intermediate light amplification functional unit (optical amplifier unit) 31, an optical branching coupler 32, an output level detecting circuit (output level detecting unit) 33, a reflection level detecting circuit (reflection level detecting unit) 34, a first deciding circuit (deciding unit) 35, and an amplifier unit control circuit (control unit) 36, by replacing the deciding circuit 30 by a second deciding circuit (deciding unit) 37, and by further adding a dispersion compensation fiber (DCF) 7.

The dispersion compensation fiber 7 is a fiber for receiving the wavelength division multiplexing signals as they are from optical branching coupler 28 via a connection optical cord 15, and for compensating for residual dispersion in the transmission path between the receiving-side optical amplification functional unit 22 and the intermediate light amplification functional unit 31. The wavelength division multiplexing signals passing through the compensation for the residual dispersion by the dispersion compensation fiber 7 are sent as they are to the intermediate light amplification functional unit 31 via a connection optical cord 16.

The intermediate light amplification functional unit 31 is a unit for optically amplifying the wavelength division multiplexing signals received from the dispersion compensation fiber 7 in accordance with the control of the amplifier unit control circuit 36, thereby compensating for the loss of the optical power level through the passive DCF of the dispersion compensation fiber 7. The wavelength division multiplexing signals optically amplified by the intermediate light amplification functional unit 31 are sent to the optical branching coupler 32.

The optical branching coupler 32 is for optically branching the wavelength division multiplexing signals optically amplified by the intermediate light amplification functional unit 31, and for optically branching the reflected light from the output optical connector end face of the receiving-side optical amplifier unit 2. A first part of the wavelength division multiplexing signals optically branched through the optical branching coupler 32 is sent out as it is to the optical multiplexer/demultiplexer unit 5 via the connection optical cord 11, a second part of the wavelength division multiplexing signals is transmitted to the output level detecting circuit 33, and the reflected light is sent to the reflection level detecting circuit 34.

The output level detecting circuit 33 is a unit for periodically detecting and observing the total optical power level (absolute value) of the wavelength division multiplexing signals optically branched through the optical branching coupler 32. The detection result of the optical power level (Prx_out) by the output level detecting circuit 33 is sent to the first deciding circuit 35.

The reflection level detecting circuit 34 is a unit for periodically detecting and observing the total optical power level (absolute value) of the reflected light optically branched through the optical branching coupler 32. The detection result of the optical power level (Prx_ref) by the reflection level detecting circuit 34 is sent to the first deciding circuit 35.

The first deciding circuit 35 is a unit for deciding that the connection optical cord 11 is in a half extracted state or completely extracted state by calculating the reflection attenuation (D=Prx_ref−Prx_out) by comparing the detection result of the optical power level (Prx_out) by the output level detecting circuit 33 with the detection result of the optical power level (Prx_ref) by the reflection level detecting circuit 34. When the reflection attenuation (D) exceeds a preset threshold, the first deciding circuit 35 decides that the connection optical cord 11 is in the half extracted state or completely extracted state, notifies the amplifier unit control circuit 36 of that (abnormality decision notification), and reduces the optical amplification of the receiving-side optical amplification functional unit 31. Besides, the first deciding circuit 35 sends the abnormality decision notification to the second deciding circuit 37 as well.

In addition, after making a decision that the connection optical cord 11 is in the half extracted state or completely extracted state, the first deciding circuit 35 decides on whether the connection optical cord 11 is in an inserted state or not by calculating the reflection attenuation (D) by comparing the detection result of the optical power level (Prx_out) by the output level detecting circuit 33 with the detection result of the optical power level (Prx_ref) by the reflection level detecting circuit 34. When the reflection attenuation (D) is not greater than the preset threshold, the first deciding circuit 35 decides that the connection optical cord 11 is in the inserted state, notifies the amplifier unit control circuit 36 of that (normality decision notification), and returns the optical amplification of the receiving-side optical amplification functional unit 31 to the normal value.

When receiving the abnormality decision notification from the first deciding circuit 35, the amplifier unit control circuit 36 reduces the optical amplification of the receiving-side optical amplification functional unit 31 by carrying out the APC. In contrast, when receiving the normality decision notification from the first deciding circuit 35, it returns the optical amplification amount to the normal value by controlling in such a manner as to make the ratio (gain) constant between the total input level and the total output level of the receiving-side optical amplification functional unit 31 by carrying out the AGC.

The second deciding circuit 37 is a unit for deciding that the connection optical cord 15 (16) is in the half extracted state or completely extracted state by calculating the reflection attenuation (D=Prx_ref−Prx_out) by comparing the detection result of the optical power level (Prx_out) by the output level detecting circuit 24 with the detection result of the optical power level (Prx_ref) by the reflection level detecting circuit 29. If the reflection attenuation (D) exceeds the preset threshold, the second deciding circuit 37 decides that the connection optical cord 15 (16) is in the half extracted state or completely extracted state, notifies the attenuator unit control circuit 26 and amplifier unit control circuit 27 of that (abnormality decision notification), and increases the optical attenuation of the variable optical attenuator unit 21 and reduces the optical amplification of the receiving-side optical amplification functional unit 22.

In addition, when receiving the abnormality decision notification from the first deciding circuit 35, the second deciding circuit 37 notifies the attenuator unit control circuit 26 and amplifier unit control circuit 27 of that (abnormality decision notification), and increases the optical attenuation of the variable optical attenuator unit 21 and reduces the optical amplification of the receiving-side optical amplification functional unit 22.

In addition, after making a decision that the connection optical cord 15 is in the half extracted state or completely extracted state, the second deciding circuit 37 decides on whether the connection optical cord 15 (16) is in an inserted state or not by calculating the reflection attenuation (D) by comparing the detection result of the optical power level (Prx_out) by the output level detecting circuit 24 with the detection result of the optical power level (Prx_ref) by the reflection level detecting circuit 29. When the reflection attenuation (D) is not greater than the preset threshold, the second deciding circuit 37 decides that the connection optical cord 15 (16) is in the inserted state, notifies the attenuator unit control circuit 26 and amplifier unit control circuit 27 of that (normality decision notification), and returns the optical attenuation of the variable optical attenuator unit 21 and the optical amplification of the receiving-side optical amplification functional unit 22 to the normal values.

As described above, according to the embodiment 5, it is configured in such a manner that when dividing the receiving-side optical amplifier unit 2 into a pre-stage optical amplifier unit consisting of the variable optical attenuator unit 21 and receiving-side optical amplification functional unit 22 and a post-stage optical amplifier unit consisting of the intermediate light amplification functional unit 31 and providing the dispersion compensation fiber 7 between the pre-stage optical amplifier unit and the post-stage optical amplifier unit, it calculates the reflection attenuation across the connection optical cord 11 and the reflection attenuation across the connection optical cords 15 and 16, that when it decides that an excessive loss in the connection optical cord 11, it reduces the optical amplification of the receiving-side optical amplifier unit 31, and that when it decides that an excessive loss occurs in the connection cord 15 (16), it increases the optical attenuation of the variable optical attenuator unit 21 and reduces the optical amplification of the receiving-side optical amplifier unit 22. Accordingly, it can achieve the same advantages of the embodiment 4 and implement a system that does not affect the signal quality of the Add wavelength even in the event of a fault in the connection optical cord 11, 15 or 16 or during maintenance work.

INDUSTRIAL APPLICABILITY

As described above, node equipment in accordance with the present invention is configured in such a manner as to comprise the output level detecting unit for detecting the optical power level of the wavelength division multiplexing signals at a pre-stage of the optical cord, the input level detecting unit for detecting the optical power level of the wavelength division multiplexing signals at a post-stage of the optical cord, the deciding unit for making an abnormality decision of the loss of the optical power level through the optical cord, and the control unit for controlling the optical attenuation of the optical attenuator unit in order to suppress sharp and large level fluctuations involved in the gain saturation of the optical amplifier during system maintenance or when a fault occurs in the node equipment and to prevent influence on the signal quality. This enables it to construct an inexpensive, highly reliable wavelength division multiplexing optical transmission system that does not affect the signal quality of a service wavelength other than the fault target even if an abnormality occurs in the connection optical cord in the node equipment.

DESCRIPTION OF REFERENCE NUMERALS 1 node equipment; 2 receiving-side optical amplifier unit; 3 signal transmitter unit; 4 signal receiver unit; 5 optical multiplexer/demultiplexer unit; 6 transmitting-side optical amplifier unit; 7 dispersion compensation fiber; 11-16 connection optical cord (optical cord); 21 variable optical attenuator unit (optical attenuator unit); 22 receiving-side optical amplification functional unit (optical amplifier unit); 23, 28, 32 optical branching coupler; 24, 33 output level detecting circuit (output level detecting unit); 25, 30 deciding circuit (deciding unit), 26 attenuator unit control circuit (control unit); 27, 36 amplifier unit control circuit (control unit); 29, 34 reflection level detecting circuit (reflection level detecting unit); 31 intermediate light amplification functional unit (optical amplifier unit); 35 first deciding circuit (deciding unit); 37 second deciding circuit (deciding unit); 51 optical branching coupler; 52 input level detecting circuit (input level detecting unit); 53 demultiplexing functional unit; 54 individual channel optical switch functional unit; 55 individual channel optical level equalizer unit; 56 multiplexing functional unit; 57 deciding circuit; 61 transmitting-side optical amplification functional unit; 62 amplifier unit control circuit; 101, 102 transmission path; 551 variable optical attenuator unit (optical attenuator unit); 552 optical branching coupler; 553 optical level detecting unit; 554 VOA control circuit unit (control unit).

What is claimed is:
1. Node equipment including an optical attenuator that optically attenuates received wavelength division multiplexing signals, and an optical multiplexer/demultiplexer that carries out optical multiplexing/demultiplexing of the wavelength division multiplexing signals received from the optical attenuator via an optical cord, the node equipment comprising:
an output level detector that detects an optical power level of the wavelength division multiplexing signals at a pre-stage of the optical cord;
an input level detector that detects an optical power level of the wavelength division multiplexing signals at a post-stage of the optical cord;
a deciding circuit that calculates a loss of an optical power level through the optical cord from the optical power level detected by the output level detector and from the optical power level detected by the input level detector, and, when the calculated loss of the optical power level exceeds a threshold, determines that the optical cord has an abnormality; and
a controller that controls the optical attenuator to increase optical attenuation when the optical cord is determined as having the abnormality.
2. The node equipment according to claim 1, further comprising:
an optical amplifier that optically amplifies the wavelength division multiplexing signals received from the optical attenuator and transmits the amplified signals to the optical multiplexer/demultiplexer via the optical cord, wherein
the controller controls the optical amplifier to decrease optical amplification when the optical cord is determined as the abnormality.
3. The node equipment according to claim 1, wherein the optical multiplexer/demultiplexer includes a demultiplexer that branches the wavelength division multiplexing signals into signal light wave for individual wavelength, and an equalizer that has an optical attenuator attenuating signal light wave,
wherein, when an optical power level of the signal light wave branched by the demultiplexer is lower than a threshold, the equalizer controls the optical attenuator to increase optical attenuation of said signal light wave.
4. The node equipment according to claim 3, wherein the optical attenuation increased by the controller is preset such that an optical power level of the signal light wave branched by the demultiplexer is lower than the threshold at the equalizer.
5. Node equipment including an optical amplifier that optically attenuates received wavelength division multiplexing signals, and an optical multiplexer/demultiplexer that carries out optical multiplexing/demultiplexing of the wavelength division multiplexing signals received from the optical amplifier via an optical cord, the node equipment comprising:
an output level detector that detects an optical power level of the wavelength division multiplexing signals at a pre-stage of the optical cord;
an input level detector that detects an optical power level of the wavelength division multiplexing signals at a post-stage of the optical cord;
a deciding circuit that calculates a loss of an optical power level through the optical cord from the optical power level detected by the output level detector and from the optical power level detected by the input level detector, and, when the calculated loss of the optical power level exceeds a threshold, determines that the optical cord has an abnormality; and
a controller that controls a signal light wave demultiplexed and passing through the optical multiplexer/demultiplexer to be optically attenuated when the optical cord is determined as having the abnormality.
6. The node equipment according to claim 5, wherein the optical multiplexer/demultiplexer includes
a demultiplexer that branches the wavelength division multiplexing signals into signal light wave for individual wavelength,
an equalizer that has an optical attenuator attenuating signal light wave, and
a switch circuit that performs a process corresponding to a wavelength of signal light wave from among a plurality of processes including a Through process of inputting, to the equalizer, the signal light wave coming from the demultiplexer,
wherein, when the optical cord is determined as having the abnormality, the equalizer increases optical attenuation of the signal light wave input by the Through process of the switch circuit.
7. Node equipment including an optical attenuator that optically attenuates received wavelength division multiplexing signals, and an optical multiplexer/demultiplexer that car- ries out optical multiplexing/demultiplexing of the wavelength division multiplexing signals received from the optical attenuator via an optical cord, the node equipment comprising:

an output level detector that detects the optical power level of the wavelength division multiplexing signals at a pre-stage of the optical cord;

a reflection level detector that detects a reflected power level from an output optical connector connected to the optical cord at the pre-stage of the optical cord;

a deciding circuit that determines whether a connection state of the optical cord has an abnormality from the optical power level detected by the output level detector and from the reflected power level detected by the reflection level detector; and a controller that controls the optical attenuation of the optical attenuator in accordance with the decision result by the deciding circuit.

8. The node equipment according to claim 7, further comprising:

an optical amplifier that optically amplifies the wavelength division multiplexing signals received from the optical attenuator and transmits the amplified signals to the optical multiplexer/demultiplexer via the optical cord, wherein the controller controls the optical amplification of the optical amplifier in accordance with the decision result by the deciding circuit.

9. The node equipment according to claim 7, wherein the optical multiplexer/demultiplexer includes a demultiplexer that branches the wavelength division multiplexing signals into signal light wave for individual wavelength, and an equalizer that has an optical attenuator attenuating signal light wave, wherein, when an optical power level of the signal light wave branched by the demultiplexer is lower than a threshold, the equalizer controls the optical attenuator to increase optical attenuation of said signal light wave.

10. The node equipment according to claim 9, wherein the optical attenuation increased by the controller is preset such that an optical power level of the signal light wave branched by the demultiplexer is lower than the threshold at the equalizer.

* * * * *